United States Patent
Roh et al.

(10) Patent No.: US 9,329,747 B2
(45) Date of Patent: May 3, 2016

(54) MOBILE TERMINAL AND CONTROLLING METHOD THEREOF

(75) Inventors: Hyeongseok Roh, Seoul (KR); Sunho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 242 days.

(21) Appl. No.: 13/422,923

(22) Filed: Mar. 16, 2012

(65) Prior Publication Data

US 2013/0063373 A1    Mar. 14, 2013

(30) Foreign Application Priority Data

Sep. 8, 2011 (KR) .................. 10-2011-0091100

(51) Int. Cl.
| | |
|---|---|
| *G06F 3/0481* | (2013.01) |
| *G06F 3/0484* | (2013.01) |
| *G06F 17/30* | (2006.01) |
| *G06F 3/0488* | (2013.01) |
| *G06F 3/0482* | (2013.01) |
| *G06F 3/0485* | (2013.01) |
| *G06F 3/16* | (2006.01) |

(52) U.S. Cl.
CPC ............ *G06F 3/0481* (2013.01); *G06F 3/0482* (2013.01); *G06F 3/0484* (2013.01); *G06F 3/04842* (2013.01); *G06F 3/04845* (2013.01); *G06F 3/04855* (2013.01); *G06F 3/04883* (2013.01); *G06F 3/04886* (2013.01); *G06F 17/30905* (2013.01); *G06F 3/167* (2013.01)

(58) Field of Classification Search
CPC .............. G06F 3/04845; G06F 3/0482; G06F 3/04842; G06F 3/0484; G06F 3/0481; G06F 3/04883

See application file for complete search history.

(56) References Cited

U.S. PATENT DOCUMENTS

| | | | |
|---|---|---|---|
| 8,903,793 B2 * | 12/2014 | Bangalore | 707/706 |
| 2006/0190436 A1 | 8/2006 | Richardson et al. | |
| 2007/0293971 A1 * | 12/2007 | Ogle et al. | 700/115 |
| 2009/0287626 A1 | 11/2009 | Paek et al. | |
| 2009/0327961 A1 | 12/2009 | De Vorchik et al. | |
| 2010/0070913 A1 | 3/2010 | Murrett et al. | |
| 2011/0145224 A1 | 6/2011 | Bangalore | |

FOREIGN PATENT DOCUMENTS

EP    2309707    4/2011

OTHER PUBLICATIONS

European Patent Office Application Serial No. 12001364.4, Search Report dated Dec. 4, 2015, 11 pages.

* cited by examiner

*Primary Examiner* — Fred Tzeng
(74) *Attorney, Agent, or Firm* — Lee, Hong, Degerman, Kang & Waimey PC; Jonathan Kang; Justin Lee

(57) ABSTRACT

A mobile terminal and controlling method thereof are disclosed. According to the present invention, after a search for informations related to an inputted search word have been performed, while the found informations are displayed, partial informations respectively representing the displayed informations by including the search word are extracted from the displayed informations. Finally, the extracted informations are enlarged and displayed as a list.

17 Claims, 23 Drawing Sheets

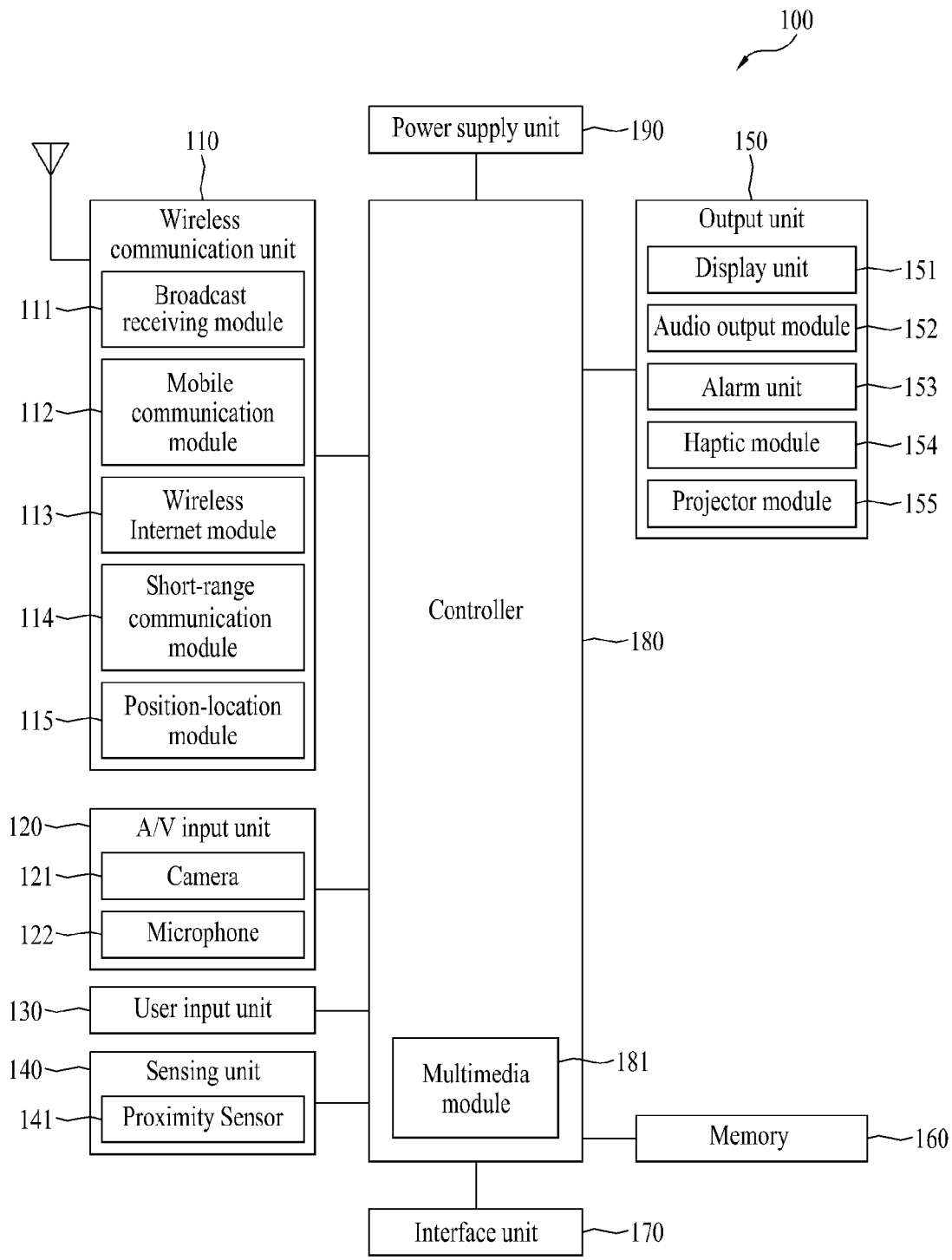

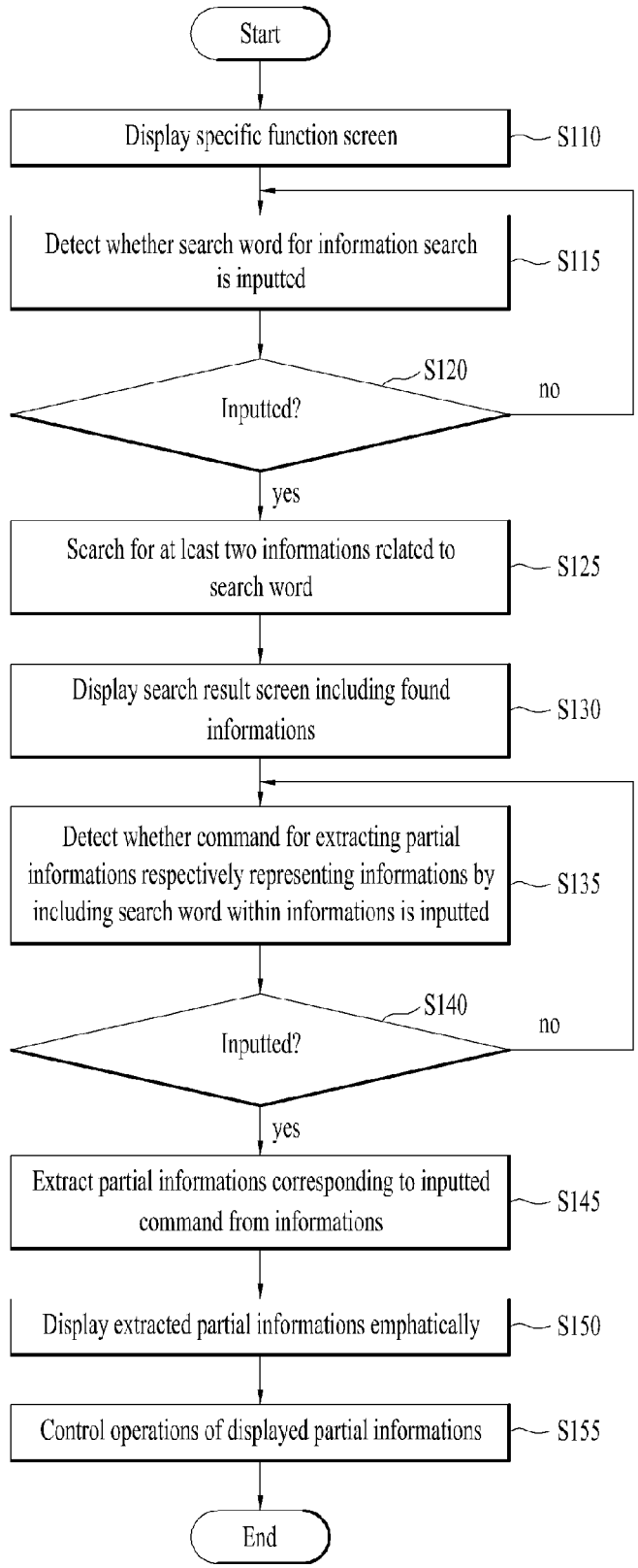

FIG. 6
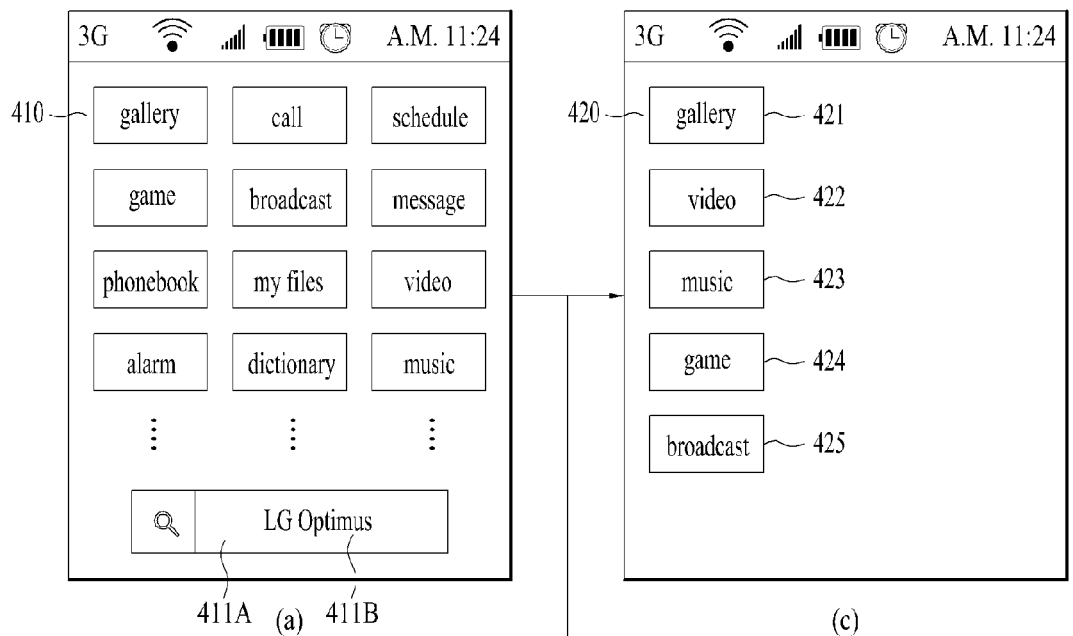
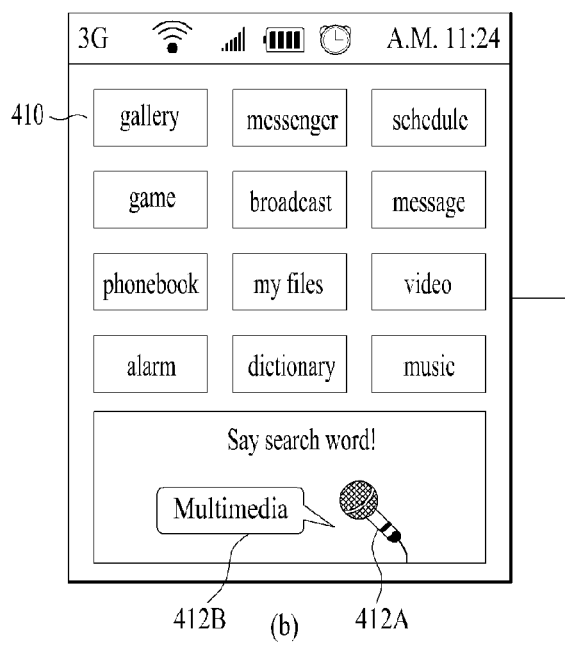

FIG. 7
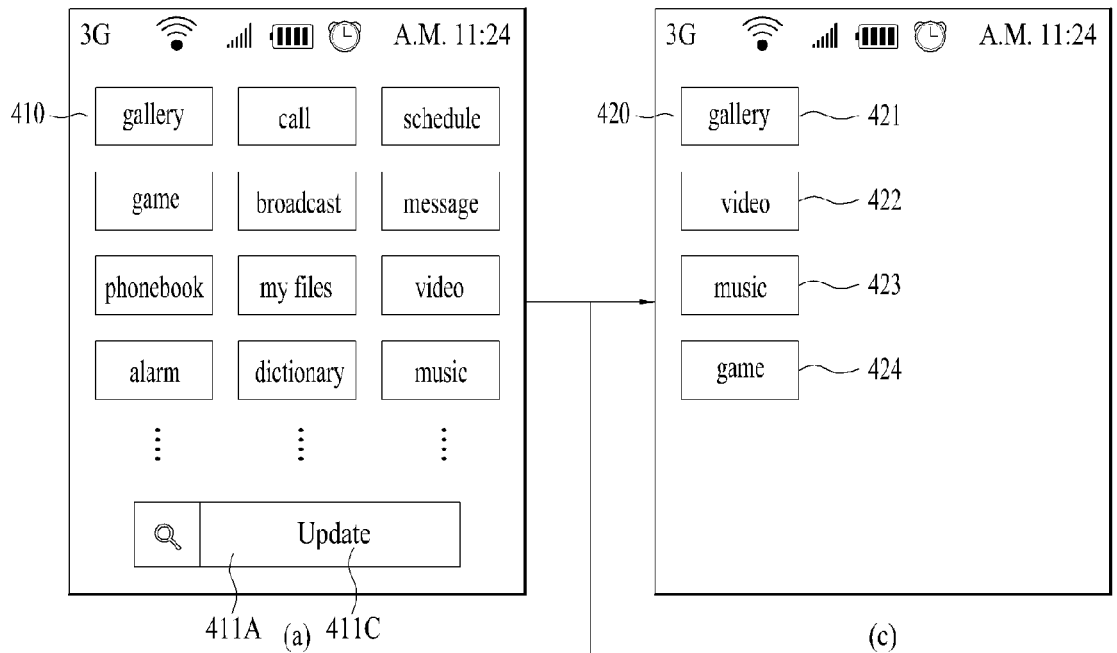
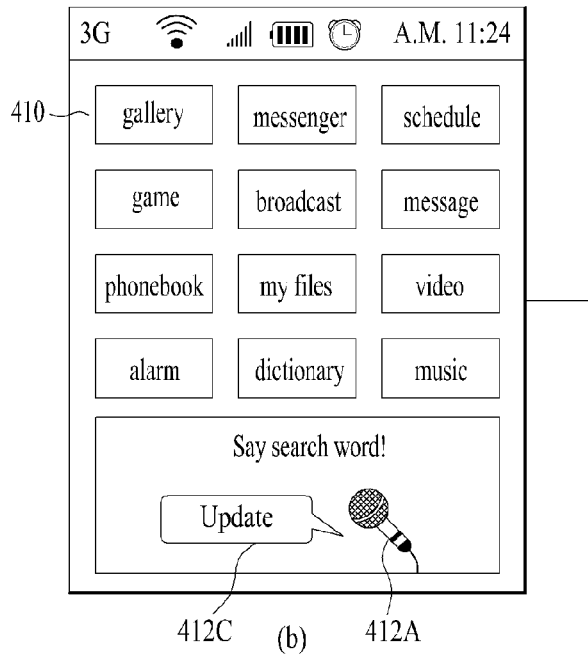

FIG. 10
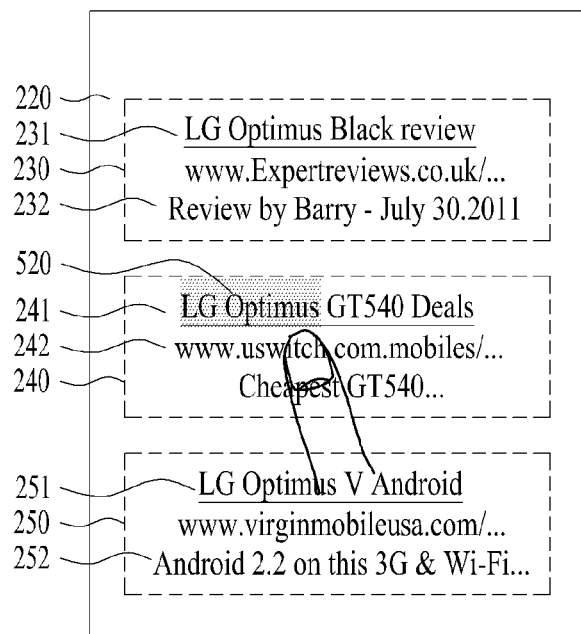
(a)
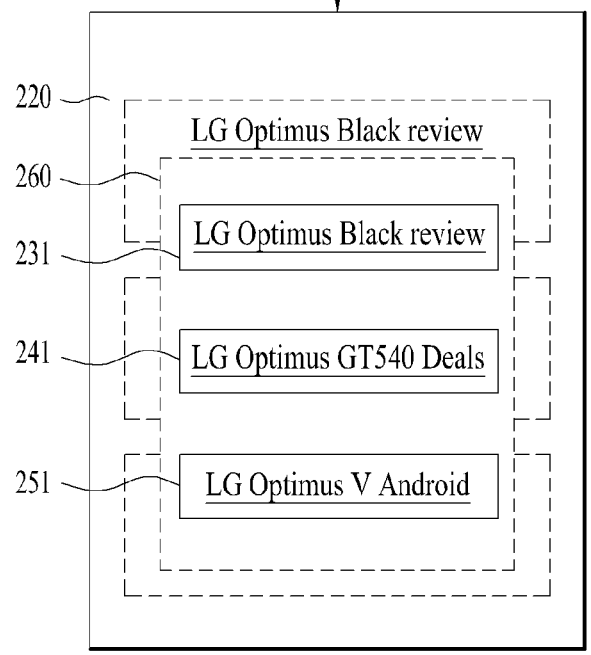
(b)

FIG. 11
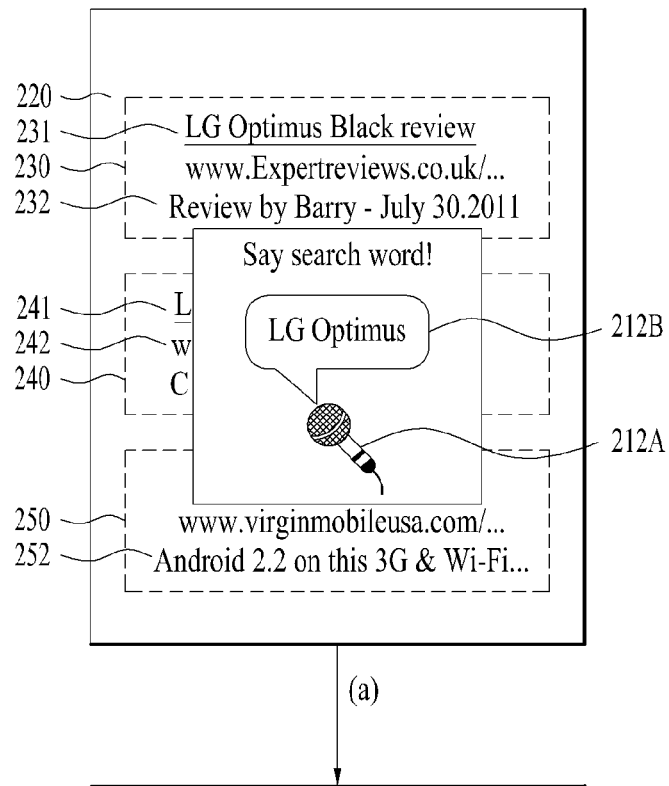
(a)
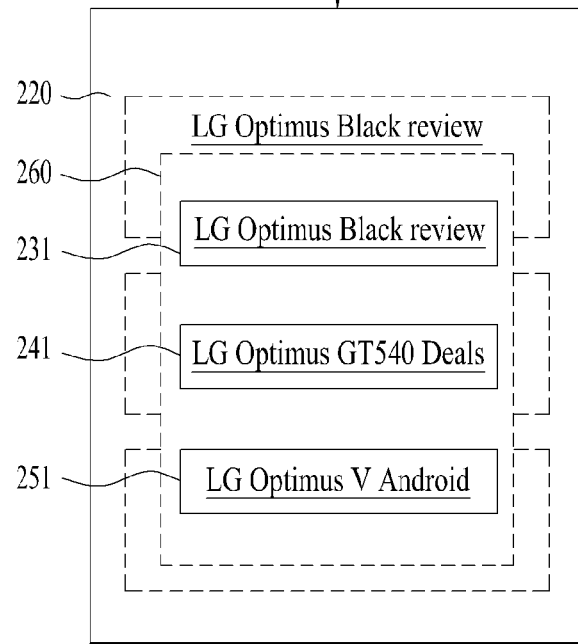
(b)

FIG. 13
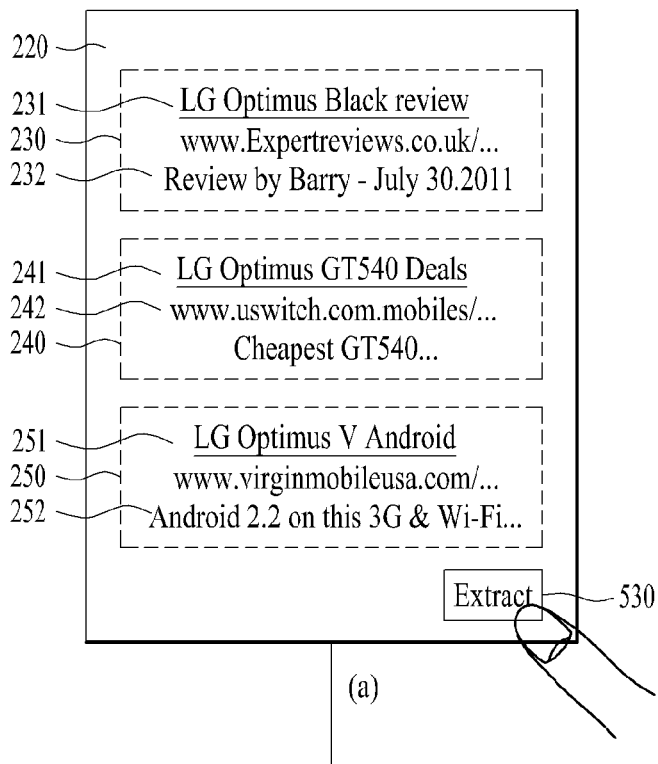
(a)
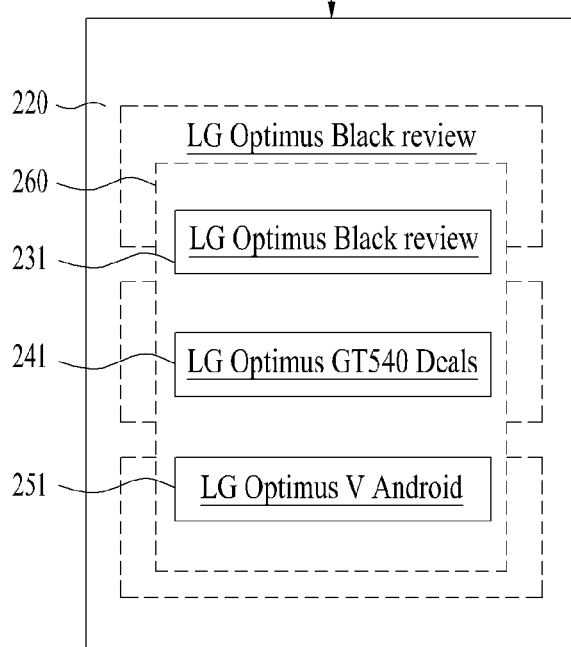
(b)

FIG. 18
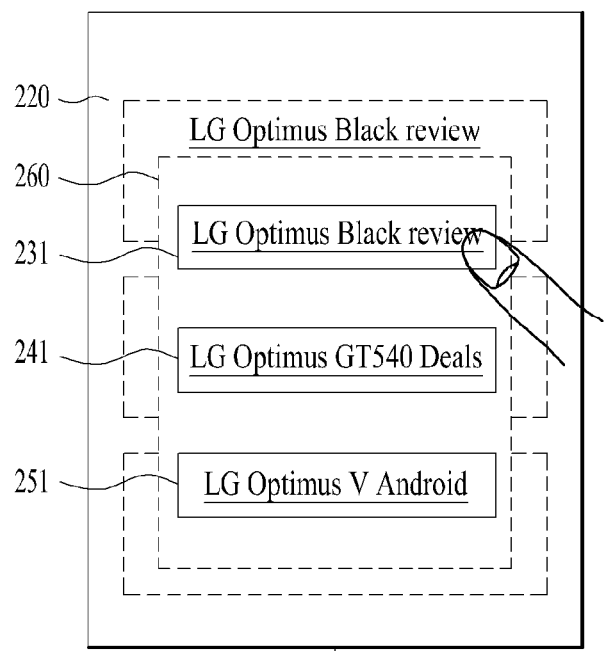
(a)
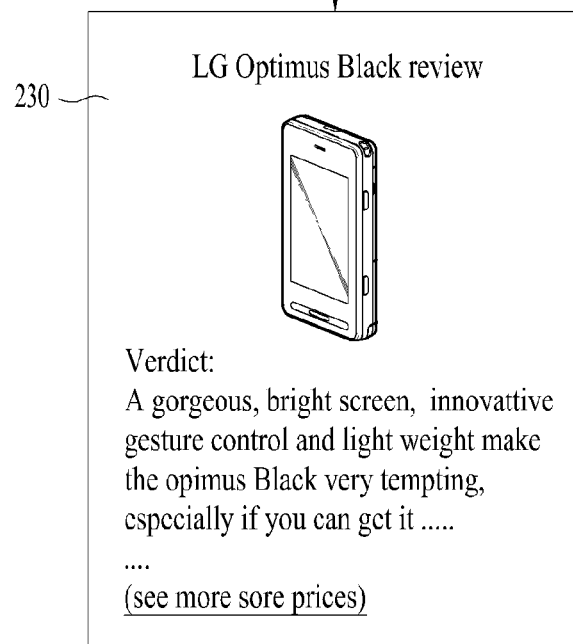
(b)

FIG. 19
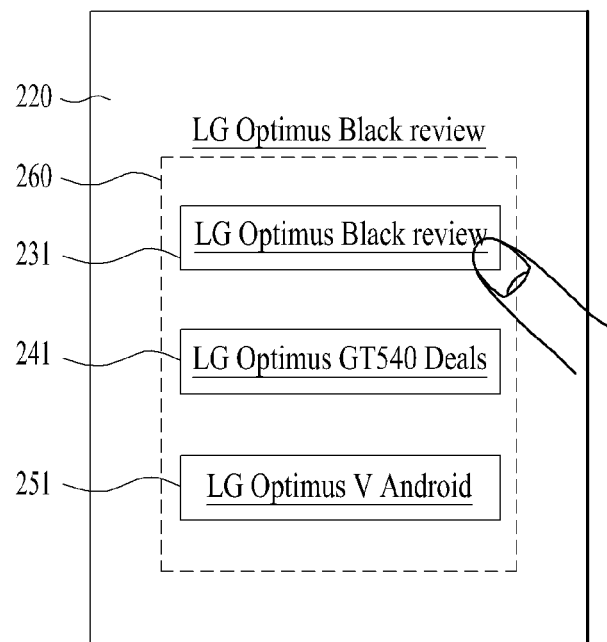
(a)
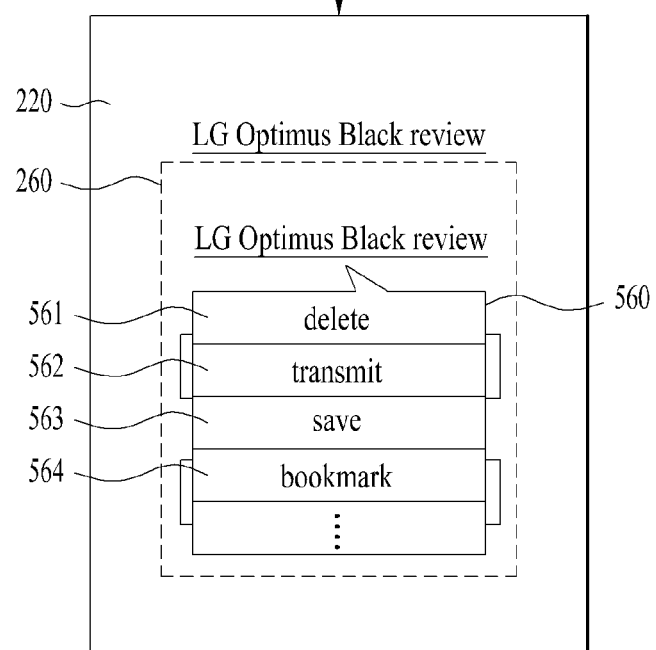
(b)

FIG. 20
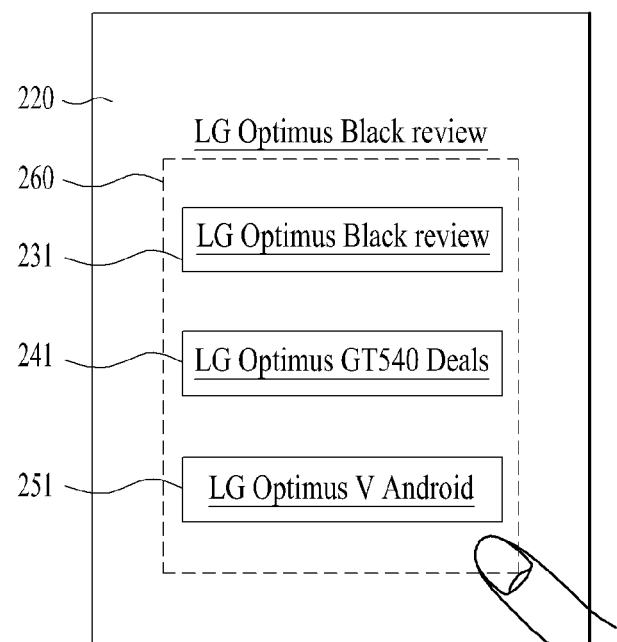
(a)
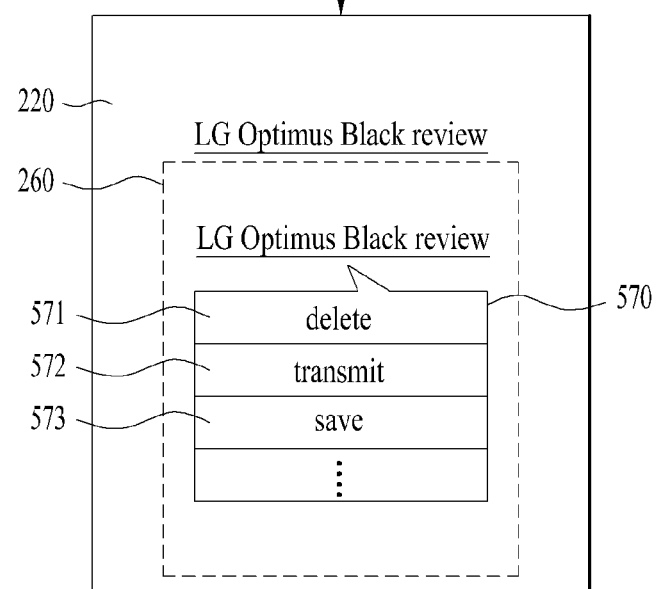
(b)

FIG. 22
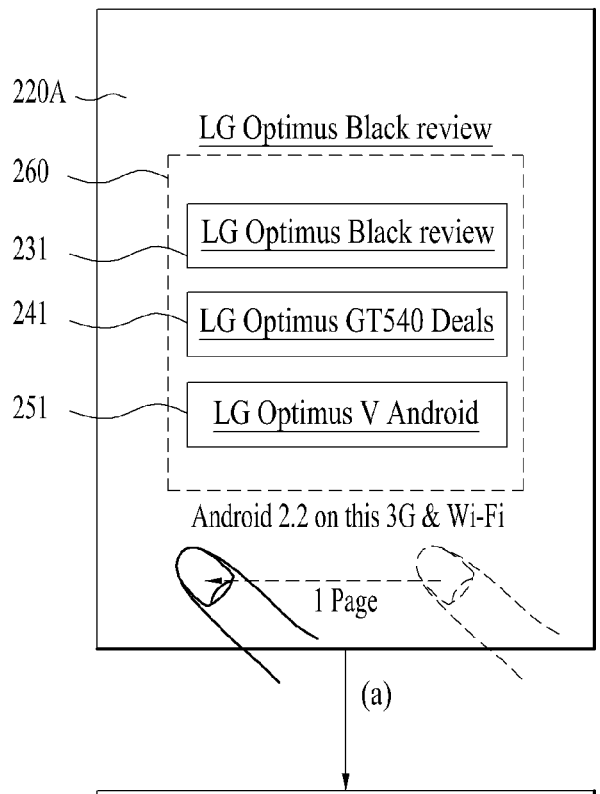
(a)
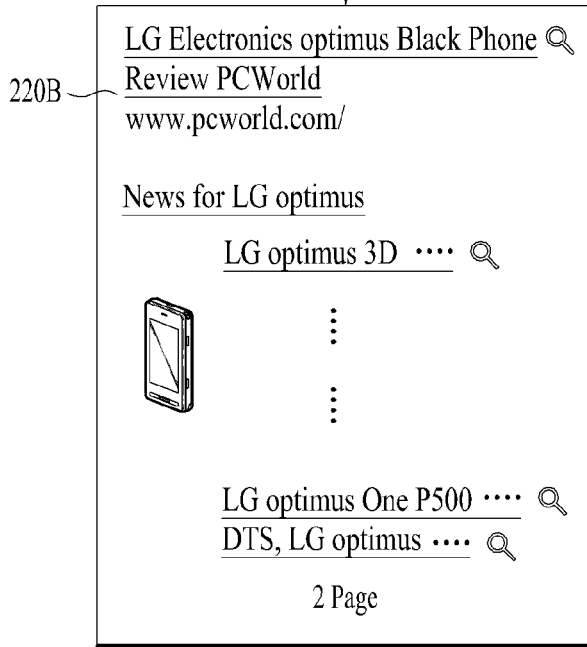
(b)

FIG. 23
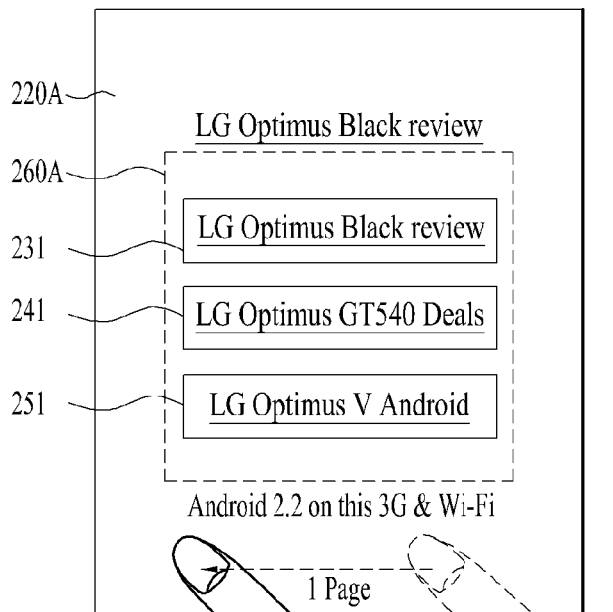
(a)
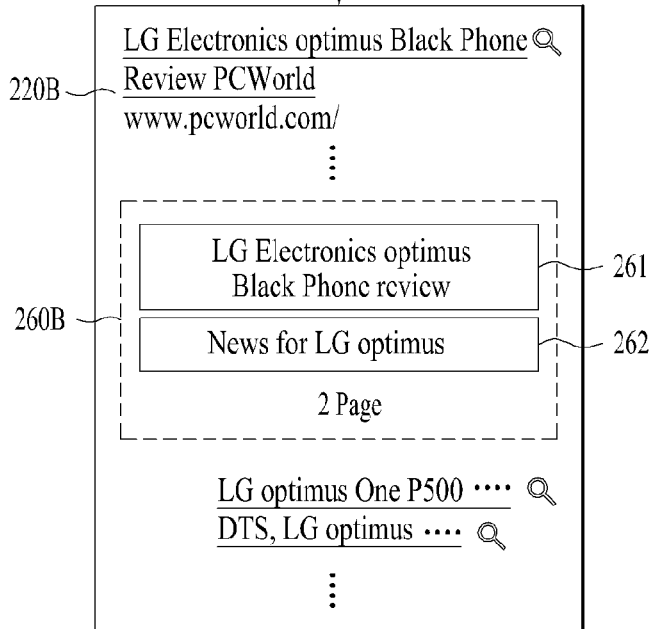
(b)

MOBILE TERMINAL AND CONTROLLING METHOD THEREOF

Pursuant to 35 U.S.C. §119(a), this application claims the benefit of earlier filing date and right of priority to Korean Application No. 10-2011-0091100, filed on Sep. 8, 2011, the contents of which are hereby incorporated by reference herein in their entirety.

BACKGROUND OF THE INVENTION

1. Field of the Invention

The present invention relates to a mobile terminal, and more particularly, to a mobile terminal and a method of controlling the mobile terminal.

2. Discussion of the Related Art

A mobile terminal is a device that can be configured to perform various functions, such as data and voice communications, capturing still images and video via a camera, recording audio, playing music files and outputting music via a speaker system, and displaying images and video on a display. Some terminals include additional functionality to support game playing, while other terminals are also configured as multimedia players. More recently, mobile terminals have been configured to receive broadcast and multicast signals to permit viewing of content, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

As mentioned in the above description, as a terminal is implemented into a multimedia device type, a size of a built-in or external memory is increased to enable storage of large-scale contents.

Recently, since a mobile terminal supports a wireless internet function, a user of the mobile terminal is able to search and view various kinds of webpages using the wireless internet function. In particular, when a plurality of hyperlinks are included in one webpage, a user is able to search for desired information by selecting one of the hyperlinks.

However, since a current mobile terminal has a small screen size, it may be difficult for a user to accurately click a hyperlink displayed in a very small size within a corresponding webpage. Moreover, it may be inconvenient for the user to click the displayed hyperlink after enlarging a region on which the hyperlink to be clicked is displayed within the webpage.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof. In particular, after a search for informations related to an inputted search word have been performed, while the found informations are displayed, partial informations respectively representing the displayed informations by including the search word are extracted from the displayed informations. Finally, the extracted informations are enlarged and displayed as a list.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to display a search result screen including at least two informations found in accordance with an inputted search word; and a controller configured to detect whether a touch command for extracting partial informations from the informations is inputted, wherein the partial informations include the search word and represent the informations, respectively, to extract the partial informations from the informations if the touch command is inputted, to emphasize extracted partial informations, and display a list including the emphasized partial informations on the search result screen.

In another aspect of the present invention, a method of controlling a mobile terminal according to the present invention includes the steps of displaying a search result screen including at least two informations found in accordance with an inputted search word, detect whether a touch command for extracting partial informations from the informations is inputted, wherein the partial informations include the search word and represent the informations, respectively, extracting the partial informations from the informations if the touch command is inputted, emphasizing the extracted partial informations, and displaying a list including the emphasized partial informations on the search result screen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 1 illustrates a block diagram of a mobile terminal in accordance with one embodiment of the present invention;

FIG. 3 is a flowchart for a method of controlling a mobile terminal according to the present invention;

FIGS. 4 to 7 are diagrams for describing the steps S110 to S130 shown in FIG. 3;

FIGS. 8 to 15 are diagrams for describing the steps S135 to S150 shown in FIG. 3; and FIGS. 16 to 24 are diagrams for describing the step S110 to S155 shown in FIG. 3.

DETAILED DESCRIPTION OF THE INVENTION

Figure 2A:
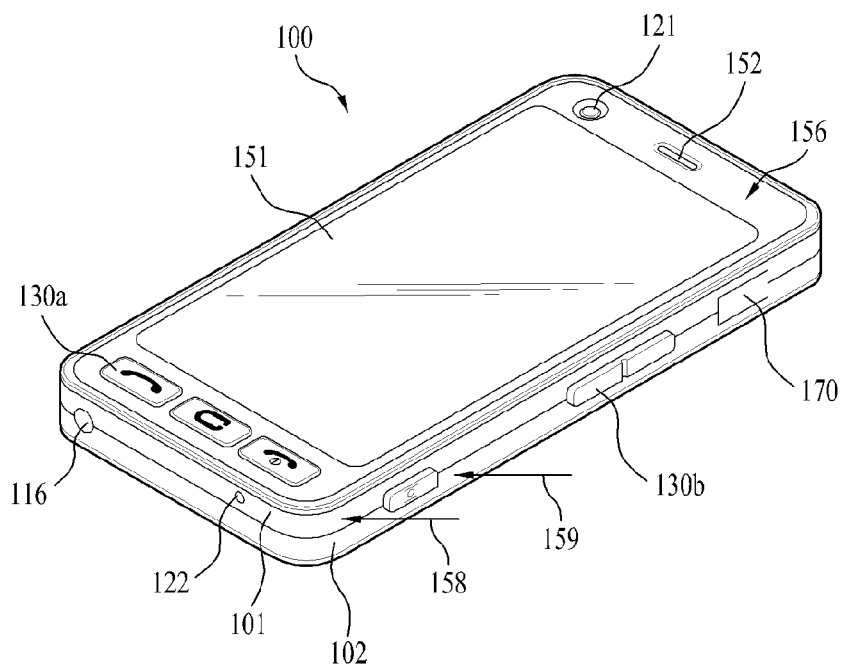
FIG. 2A is a front perspective view of the mobile terminal in accordance with one embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipments, smart phones, digital televisions (DTVs), computers, digital broadcast terminals, personal digital assistants, portable multimedia players (PMP) and navigators.

For ease of description, the present invention will be described with respect to a mobile terminal 100 shown in FIGS. 1 through 2B. However, it should be understood that the present invention can also be applied to other types of terminals.

FIG. 1 illustrates an exemplary block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast related information from an external broadcast management server via a broadcast channel. In one embodiment, the mobile terminal 100 can be configured to include two or more broadcast receiving modules 111 to enable simultaneous reception of two or more broadcast channels or to facilitate switching of broadcast channels.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include broadcast channel information, broadcast program information, or broadcast service provider information. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, digital video broadcast-convergence of broadcast and mobile services (DVB-CBMS), Open Mobile Alliance broadcast (OMA-BCAST), the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the above-described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The wireless Internet module 113 can be a module that supports Internet access for the mobile terminal 100. For example, the wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi, Wireless Broadband (WiBro™), World Interoperability for Microwave Access (WiMAX™), or High Speed Downlink Packet Access (HSDPA).

Moreover, as mentioned in the foregoing description, the wireless internet module 113 can receive or download the data relevant to the area, in which the mobile terminal 100 is located, from the external server.

The short-range communication module 114 can be a module for supporting relatively short-range communications. For example, the short-range communication module 114 can be configured to communicate using short range communication technology, such as, radio frequency identification (RFID), Infrared Data Association (IrDA), or Ultra-wideband (UWB), as well as networking technologies, such as Bluetooth™ or ZigBee™.

The position-location module 115 identifies or otherwise recognizes the location of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can have a digital zoom feature and can process image frames of still images or video recognized by an image sensor of the camera 121 in a video call mode or a photographing mode. The processed image frames can be displayed on a display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 can receive an external audio signal while operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information processed by the mobile terminal 100.

For example, when the mobile terminal 100 is in a call mode, the display unit 151 can display a user interface (UI) or a graphic user interface (GUI) for placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151 according to the configuration of the mobile terminal 100.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be of a transparent type or a light transmittive type, such that the display unit 151 is implemented as a transparent display. For example, the transparent display can include a transparent OLED (TOLED) display. The rear structure of the display unit 151 can also be of a light transmittive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to detect a touched portion of the display unit 151.

The proximity sensor 141 of the sensing unit 140 can be located in an internal region of the mobile terminal 100 and either enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor and, therefore, can have wide applications in the mobile terminal 100.

The proximity sensor 141 can include a transmittive photo-electric sensor, a direct reflection photo-electric sensor, a mirror reflection photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

Via the proximity sensor 141, a proximity touch and a proximity touch pattern, such as a proximity touch distance, a proximity touch duration, a proximity touch position, or a proximity touch movement state can be detected. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100, such as a call received event, a message received event and a touch input received event, using a vibration as well as video or audio signals. The video or audio signals can also be output via the display unit 151 or the audio output module 152. Therefore, in various embodiments, the display unit 151 or the audio output module 152 can be considered as a part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, means for producing the image (not shown) to be projected via the light generated from the light source, and a lens (not shown) for enlarging the projected image according to a predetermined focus distance. The projector module 155 can further include a device (not shown) for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of display used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, such types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identify module (UIM), a subscriber identify module (SIM) or a universal subscriber identify module (USIM). A device including the identity module (hereinafter referred to as "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The power supply unit 190 can be an external power source, an internal power source, or a combination thereof. The power supply unit 190 can supply power to other components in the mobile terminal 100.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

FIG. 2A is a front perspective view of the mobile terminal 100 in accordance with one embodiment of the present invention. In FIG. 2A, the mobile terminal 100 is shown to have a bar type terminal body.

However, it should be understood that the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2A, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the user input module 130a and the microphone 122 can be located in proximity to another end of the display unit 151. As further shown in FIG. 2A, the user input module 130b and the interface unit 170 are arranged on the sides of the front case 101 and the rear case 102, such as sides 158 and 159, respectively.

The user input unit 130 described previously with respect to FIG. 1 can be configured to receive a command for controlling an operation of the mobile terminal 100 and can include one or more user input modules 130a and 130b shown in FIG. 2A. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured allow a user to input such commands as "start," "end," and "scroll" to the mobile terminal 100. The user input module 130b can allow a user to input a command for adjusting the volume of the audio output unit 152 or a command for switching to a touch recognition mode of the display unit 151.

Figure 2B:
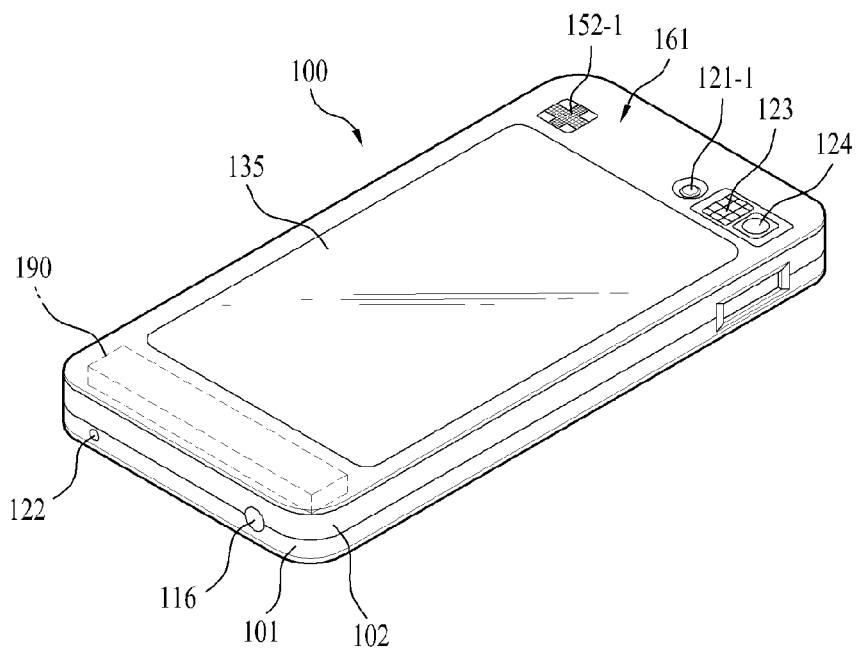
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user in real-time for a video call, whereas the camera 121-1 can operate with a relatively higher resolution than the camera 121 to capture images of general objects with high picture quality, which may not require immediate transmission in real-time, and may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the audio output module 152 shown in FIG. 2A and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna can be pulled out and retracted into the body of the mobile terminal 100.

FIG. 2B shows the power supply unit 190 for providing power to the mobile terminal 100. For example, the power supply unit 190 can be situated either inside the mobile terminal 100 or detachably coupled to the mobile terminal 100.

As shown in FIG. 2B, a touch pad 135 for sensing a touch by the user can be located on the rear surface 161 of the rear case 102. In one embodiment, the touch pad 135 and the display unit 151 can be translucent such that the information displayed on display unit 151 can be output on both sides of the display unit 151 and can be viewed through the touch pad 135. The information displayed on the display unit 151 can be controlled by the touch pad 135. In another embodiment, a second display unit in addition to display unit 151 illustrated in FIG. 2A can be located on the rear surface 161 of the rear case 102 and combined with the touch pad 135 to form a touch screen on the rear case 102.

The touch pad 135 is activated by interconnecting with the display unit 151 of the front case 101. The touch pad 135 can be located in parallel with the display unit 151 and behind the display unit 151. The touch pad 135 can have the same or smaller size than the display unit 151.

In the following description, a process for extracting partial informations respectively representing informations found in accordance with an inputted search word by including the search word from the found informations and then emphatically displaying the extracted partial informations is explained in detail with reference to FIGS. 3 to 24.

FIG. 3 is a flowchart for a method of controlling a mobile terminal according to the present invention.

Referring to FIG. 3, while a screen of a specific function of a mobile terminal 100 is displayed [S110], a controller 180 may detect whether a search word is inputted by a user to search for searchable information within the specific function [S115].

In this case, the specific function may include one of a webpage possible for an information search related to a search word, a document possible for a word or sentence search related to a search word, a standby/home/menu screen possible for an application search related to a search word and the like.

If the search word is inputted [S120], the controller 180 searches the specific function for informations related to the inputted search word [S125].

In doing so, the user may input a search word corresponding to a text or voice within the specific function.

In particular, if the user inputs a text search word via a text search word input window included in the specific function, the controller 180 may be able to search the specific function for informations related to the inputted text search word.

Moreover, if a function for a voice search word input is selected from the screen of the specific function, the controller 180 activates a microphone 122. If a user's voice search word is inputted via the microphone 122, the controller 180 recognizes the inputted voice search word and may be then able to search the specific function for informations related to the recognized voice search word. In doing so, the controller 180 converts the inputted voice search word to a text and may be then able to search the specific function for informations related to the converted text.

A process for searching the specific function for informations in accordance with the text search word or the voice search word shall be described in detail with reference to FIGS. 4 to 7 later.

Meanwhile, when the controller 180 searches the specific function for the informations related to the inputted search word, it may be able to use the following search schemes.

First of all, the controller 180 may be able to search the specific function for informations having titles including the inputted search word. For instance, when informations respectively having titles 'baseball video', 'classic music' and 'basketball video' are provided within the specific function, if the inputted search word is 'video', the controller 180 searches the specific function for 'baseball video' and 'basketball video' each of which includes the search word 'video'.

Secondly, the controller 180 may be able to search the specific function for informations belonging to the same category of the inputted search word. For instance, when informations 'video', 'phonebook', 'schedule' and the like, if the inputted search word is 'movie', the controller 180 searches the specific function for 'video' belonging to the same 'multimedia category' of the search word 'movie'.

Thirdly, the controller 180 may be able to search the specific function for informations having the same semantic of the inputted search word.

Meanwhile, the controller 180 may display a search result screen including the informations found by the steps S110 to S125 on the touchscreen 151 [S130].

In this case, according to the present invention, the informations may include at least two hyperlinks found from a webpage screen in accordance with the search word.

And, according to the present invention, the informations may include words, sentences, paragraphs and the like found from a document screen in accordance with the search word.

Moreover, according to the present invention, the informations may include at least one or more applications found from standby/home/menu screen including a plurality of applications in accordance with the search word.

Subsequently, the controller 180 may detect whether a user's command for extracting partial informations respectively representing the found informations by including the search word from the found informations is inputted [S135].

In doing so, if the found information is a hyperlink related to the search word within the webpage screen, the partial information has the search word included in a title of the information included in the corresponding hyperlink and may include title information representing the hyperlink, preview information, image information and the like.

If the found information is a sentence or paragraph related to the search word within the document screen, the partial information may include a line containing the search word within the corresponding sentence or paragraph.

If the found information is an application related to the search word within the standby screen, the partial information may include an application icon, a text or the like, which contains the search word, within the application.

The found information and the partial information shall be described in detail with reference to FIGS. 8 to 26 later.

Meanwhile, as a result of the detection in the step S135, if the user command is inputted [S140], the controller 180 extracts the partial informations corresponding to the inputted command from the found informations [S145], displays the extracted partial informations on the search result screen as a list in a manner of emphasizing the extracted partial informations [S150], and controls operations of the displayed partial informations in accordance with a user manipulation [S155].

The process shown in FIG. 3 is described in detail with reference to FIGS. 4 to 24 as follows.

First of all, a process for searching for the information related to the search word in accordance with the steps S110 to S130 shown in FIG. 3 is described in detail with reference to FIGS. 4 to 7.

FIGS. 4 to 7 are diagrams for describing the steps S110 to S130 shown in FIG. 3.

Figure 4:
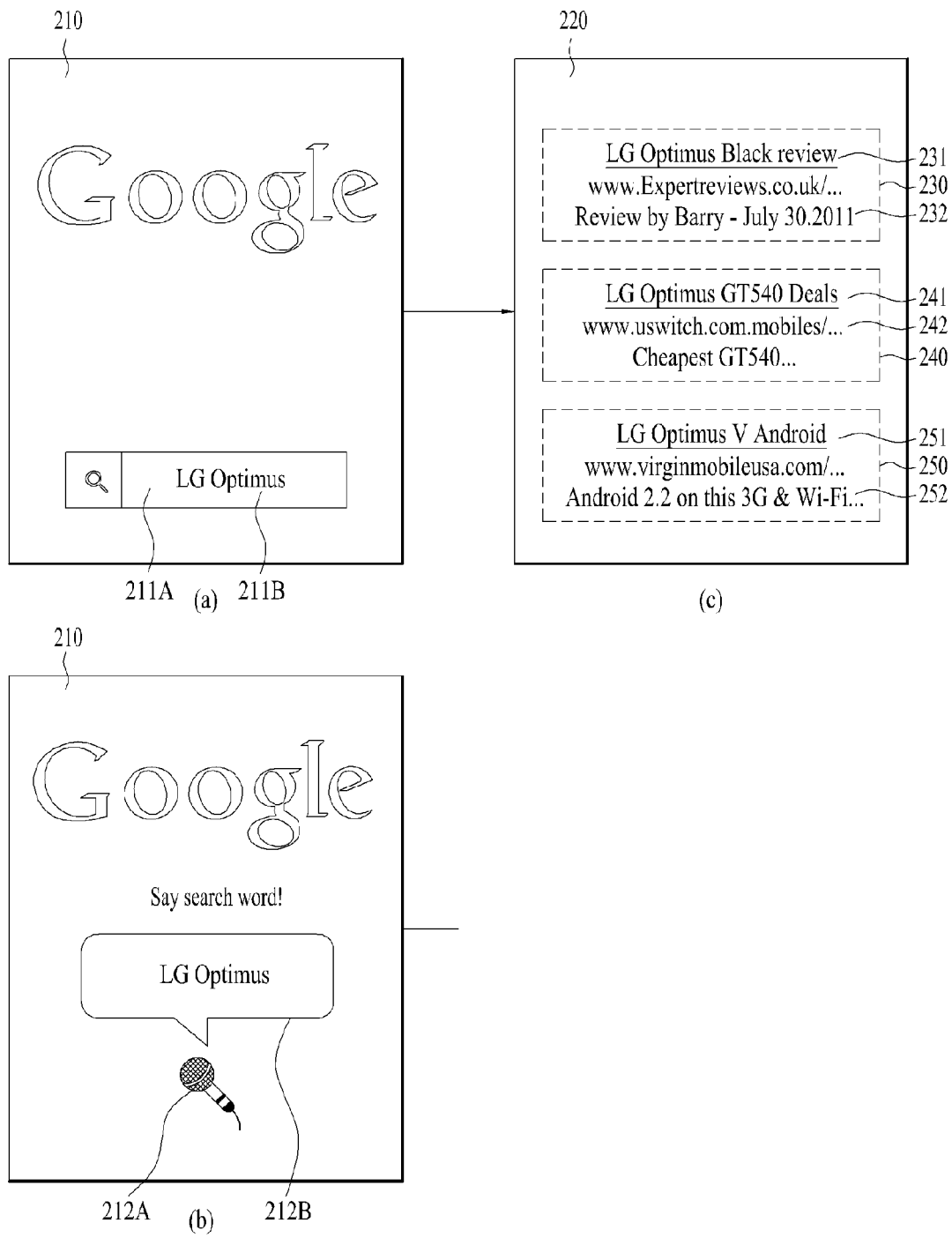

FIG. 4 shows that the specific function screen is a webpage screen 210 available for an information search.

Referring to FIG. 4 (*a*), if a text search word 'LG Optimus' 211B is inputted via a text search word input window 211A within the webpage screen 210, the controller 180 searches a web for hyperlinks 230, 240 and 250 related to the inputted text search word 'LG Optimus' 211B via the webpage. Referring to FIG. 4 (c), the controller 180 then displays a search result screen 220 containing the found hyperlinks 230, 240 and 250.

Referring to FIG. 4 (b), if a function 212A for a voice search word input is selected from the webpage screen 210, the controller 180 activates a microphone 122. If a user's voice search word 'LG Optimus' 212B is inputted via the microphone 122, the controller 180 searches a web for hyperlinks 230, 240 and 250 related to the inputted search word 'LG Optimus' 212B via the webpage. Referring to FIG. 4 (c), the controller 180 then displays a search result screen 220 containing the found hyperlinks 230, 240 and 250.

In this case, referring to FIG. 4 (c), the hyperlinks 230, 240 and 250 include title informations 231, 241 and 251 and preview informations 232, 242 and 252 of webpages linked to the hyperlinks 230, 240 and 250, respectively. And, the partial informations mentioned in the step S145 shown in FIG. 3 may become the title informations 231, 241 and 251, respectively.

Figure 5:
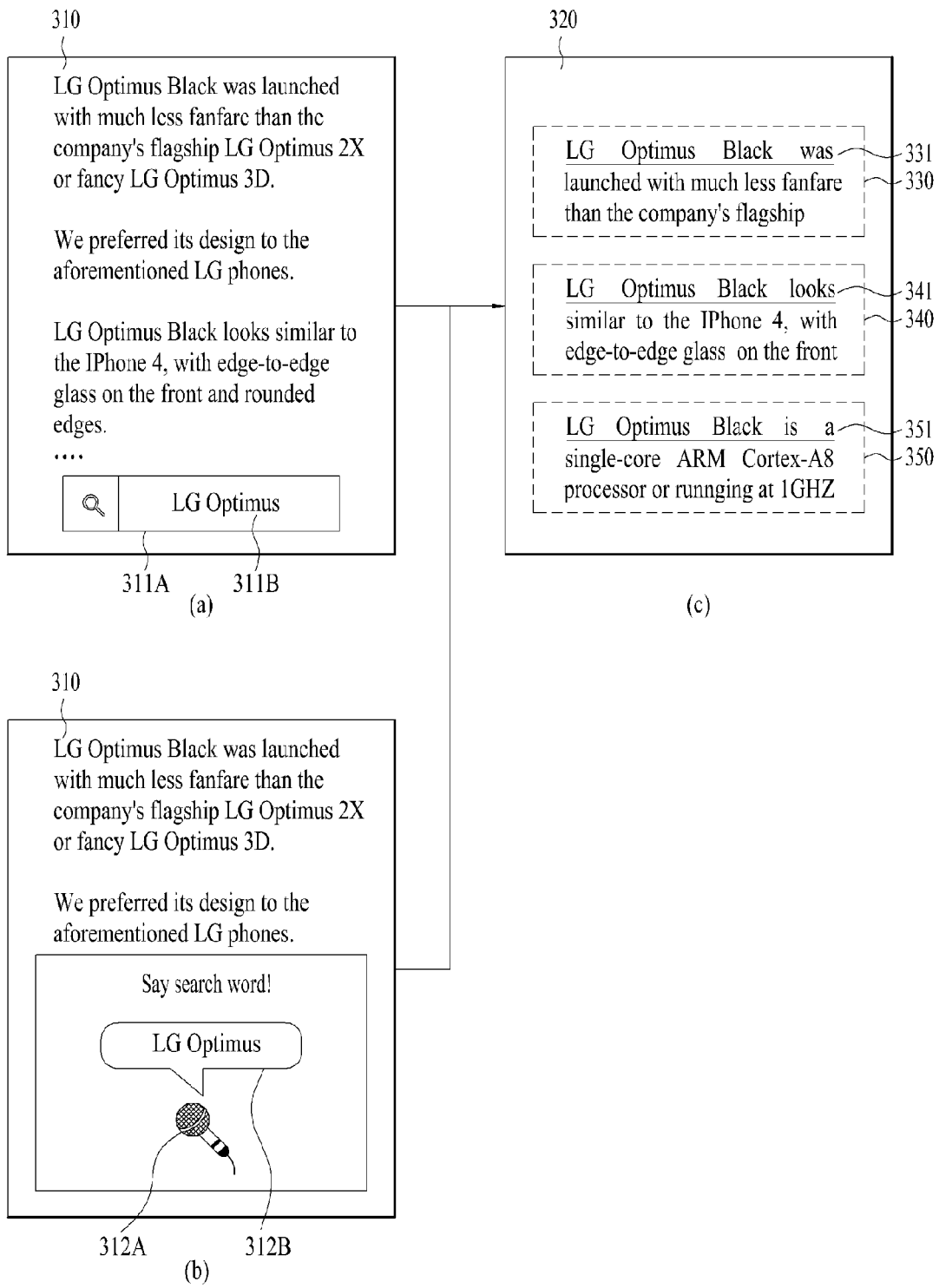

FIG. 5 shows that the specific function screen is a document screen 310 available for an information search.

Referring to FIG. 5 (a), if a text search word 'LG Optimus' 311B is inputted via a text search word input window 311A within the document screen 310, the controller 180 searches the document for sentences 330, 340 and 350 related to the inputted text search word 'LG Optimus' 311B. Referring to FIG. 5 (c), the controller 180 then displays a search result screen 320 containing the found sentences 330, 340 and 350.

Referring to FIG. 5 (b), if a function 312A for a voice search word input is selected from the document screen 310, the controller 180 activates a microphone 122. If a user's voice search word 'LG Optimus' 312B is inputted via the microphone 122, the controller 180 searches the document for sentences 330, 340 and 350 related to the inputted search word 'LG Optimus' 312B. Referring to FIG. 5 (c), the controller 180 then displays a search result screen 320 containing the found sentences 330, 340 and 350.

In this case, referring to FIG. 5 (c), lines 331, 341 and 351 containing the search word 'LG Optimus' are included in the sentences 330, 340 and 350, respectively. And, the partial informations mentioned in the step S145 shown in FIG. 3 may become the lines 331, 341 and 351, respectively.

FIG. 6 shows that the specific function screen is a standby screen 410 including a plurality of applications.

Referring to FIG. 6 (a), if a text search word 'Multimedia' 411B is inputted via the text search word input window 311A within the standby screen 410, the controller 180 searches a plurality of applications currently installed in a mobile terminal 100 for applications 421 to 425 related to the 'Multimedia' 411B. Referring to FIG. 6 (c), the controller 180 then displays a search result screen 420 containing the found applications 421 to 425.

In particular, the controller 180 searches the applications installed in the mobile terminal 100 for the applications of a gallery 421, a video 422, a music 423, a game 424 and a broadcast 425, which belong to the search word category of the 'Multimedia' 411B.

Referring to FIG. 6 (b), if a function 412A for a voice search word input is selected from the standby screen 410, the controller 180 activates a microphone 122. If a user's voice search word 'Multimedia' 412B is inputted via the microphone 122, the controller 180 searches the applications currently installed in a mobile terminal 100 for the applications 421 to 425 related to the inputted search word 'Multimedia' 412B. Referring to FIG. 6 (c), the controller 180 then displays a search result screen 420 containing the found applications 421 to 425.

In this case, referring to FIG. 6 (c), the titles (e.g., gallery, video, music, game and broadcast) related to the category of the search word 'Multimedia' are displayed on the applications 421 to 425, respectively. And, the partial informations mentioned in the step S145 shown in FIG. 3 may become the titles of the found applications 421 to 425, respectively.

Referring to FIG. 7 (a), if a text search word 'Update' 411C is inputted via the text search word input window 311A within the standby screen 410, the controller 180 searches a plurality of applications currently installed in a mobile terminal 100 for applications 421 to 425 to be updated in accordance with the 'Update' 411C. Referring to FIG. 7 (c), the controller 180 then displays a search result screen 420 containing the found applications 421 to 425.

Referring to FIG. 7 (b), if a function 412A for a voice search word input is selected from the standby screen 410, the controller 180 activates a microphone 122. If a user's voice search word 'Update' 412C is inputted via the microphone 122, the controller 180 searches the applications currently installed in a mobile terminal 100 for the applications 421 to 425 to be updated in accordance with the 'Update' 412C. Referring to FIG. 7 (c), the controller 180 then displays a search result screen 420 containing the found applications 421 to 425.

In this case, referring to FIG. 7 (c), the titles of the applications 421 to 425 may become the partial informations mentioned in the step S145 shown in FIG. 3, respectively.

In the above description, the process for searching for the information related to the search word in accordance with the steps S110 to S130 shown in FIG. 3 is explained with reference to FIGS. 4 to 7.

In the following description, a process for extracting and displaying partial informations respectively representing the found informations by including a search word in accordance with the user's extraction command described with reference to the steps S135 to S150 shown in FIG. 3 is explained in detail with reference to FIGS. 8 to 15.

FIGS. 8 to 15 are diagrams for describing the steps S135 to S150 shown in FIG. 3.

Figure 8:
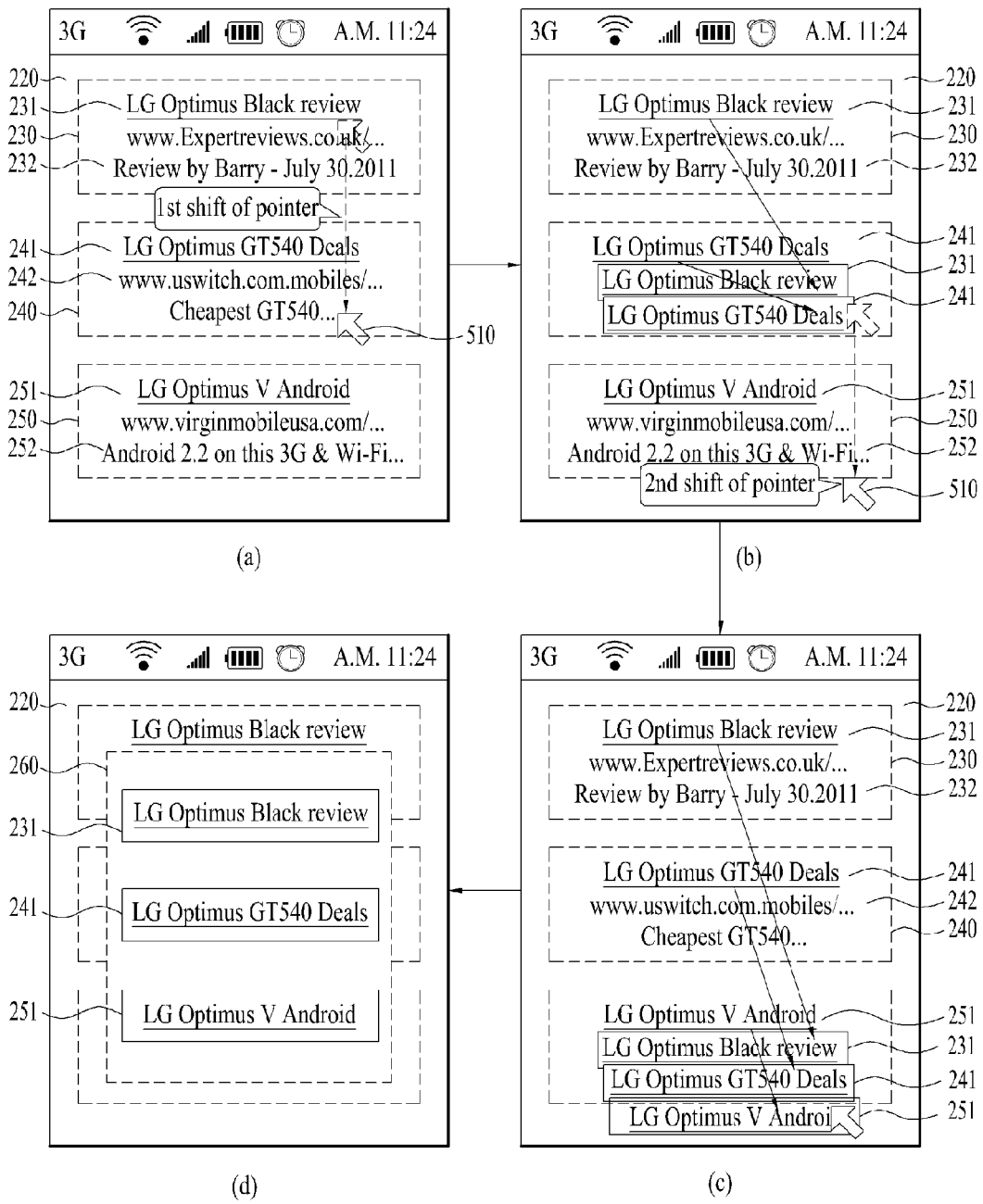

FIG. 8 shows a following process. First of all, a pointer is displayed on the search result screen displayed in the steps S110 to S130 shown in FIG. 3. Secondly, if the pointer is shifted as the extraction command within the search result screen by a user, partial informations of informations proximate to the pointer shifted position are extracted and displayed in order of the proximity to the pointer.

In particular, referring to FIG. 8 (a), after a pointer 510 has been displayed on a webpage search result screen 220 described in the steps S110 to S130 shown in FIG. 3, if a user touches and shifts the pointer 510 to a $2^{nd}$ position from an initial $1^{st}$ position, the controller 180 recognizes a $1^{st}$ hyperlink 230 proximate to the $1^{st}$ position and a $2^{nd}$ hyperlink 240 proximate to the $2^{nd}$ position.

Referring to FIG. 8 (b), $1^{st}$ and $2^{nd}$ partial informations 231 and 241, which represent $1^{st}$ and $2^{nd}$ hyperlinks 230 and 240 by including the search word (LG Optimus), are extracted from the recognized $1^{st}$ and $2^{nd}$ hyperlinks 230 and 240, respectively. The extracted $1^{st}$ and $2^{nd}$ partial informations 231 and 241 are emphasized with visual effect. The emphasized $1^{st}$ and $2^{nd}$ partial informations 231 and 241 are displayed in a manner of being aligned at the end position to which the pointer 510 has been shifted.

In this case, FIG. 8 shows that the extracted $1^{st}$ and $2^{nd}$ partial informations 231 and 241 are title informations 231 and 241 of the $1^{st}$ and $2^{nd}$ hyperlinks 230 and 240, respectively. And, the controller 180 may be able to enlarge and emphasize display sizes and touch recognized regions of the extracted $1^{st}$ and $2^{nd}$ partial informations 231 and 241.

In particular, while the pointer 520 is being shifted, the controller 180 extracts the corresponding partial informations of the hyperlinks in order of proximity to the pointer 520. The extracted partial informations may be then able to provide a user with a visual effect as if gradually attached to the shifted pointer 530 like a magnet.

Subsequently, referring to FIG. 8 (b), while the $1^{st}$ and $2^{nd}$ partial informations 231 and 241 are aligned with the pointer 530 shifted to the $2^{nd}$ position, if the user shifts the pointer 510 to a $3^{rd}$ position from the $2^{nd}$ position, the controller 180 displays the pointer 510 at the $3^{rd}$ position together with the $1^{st}$ and $2^{nd}$ partial informations 231 and 241 and then recognizes a $3^{rd}$ hyperlink 250 proximate to the $3^{rd}$ position.

Referring to FIG. 8 (c), a $3^{rd}$ partial information 251, which represents the $3^{rd}$ hyperlink 250 by including the search word (LG Optimus), is extracted from the recognized $3^{rd}$ hyper link 250. A display size and touch recognized region of the extracted $3^{rd}$ partial information 251 are enlarged. The enlarged $3^{rd}$ partial information 251 is then displayed in a manner of being aligned at the $3^{rd}$ position, to which the pointer 510 is shifted, together with the $1^{st}$ and $2^{nd}$ partial informations 231 and 241.

If the user releases the touch of the pointer 510 having shifted to the $3^{rd}$ position together the $1^{st}$ to $3^{rd}$ partial informations 231, 241 and 251, referring to FIG. 8 (d), the controller 180 configures a list 260 of the $1^{st}$ to $3^{rd}$ partial informations 231, 241 and 251 aligned at the position of the pointer 510 and then displays the list 260 on the search result screen 220.

In doing so, the list 260 including the $1^{st}$ to $3^{rd}$ partial informations 231, 241 and 251 may be displayed on the search result screen 220 as a popup window. And, the list 260 including the $1^{st}$ to $3^{rd}$ partial informations 231, 241 and 251 may be transparently displayed to enable the user to view both of the search result screen 220 and the list 260.

Figure 9:
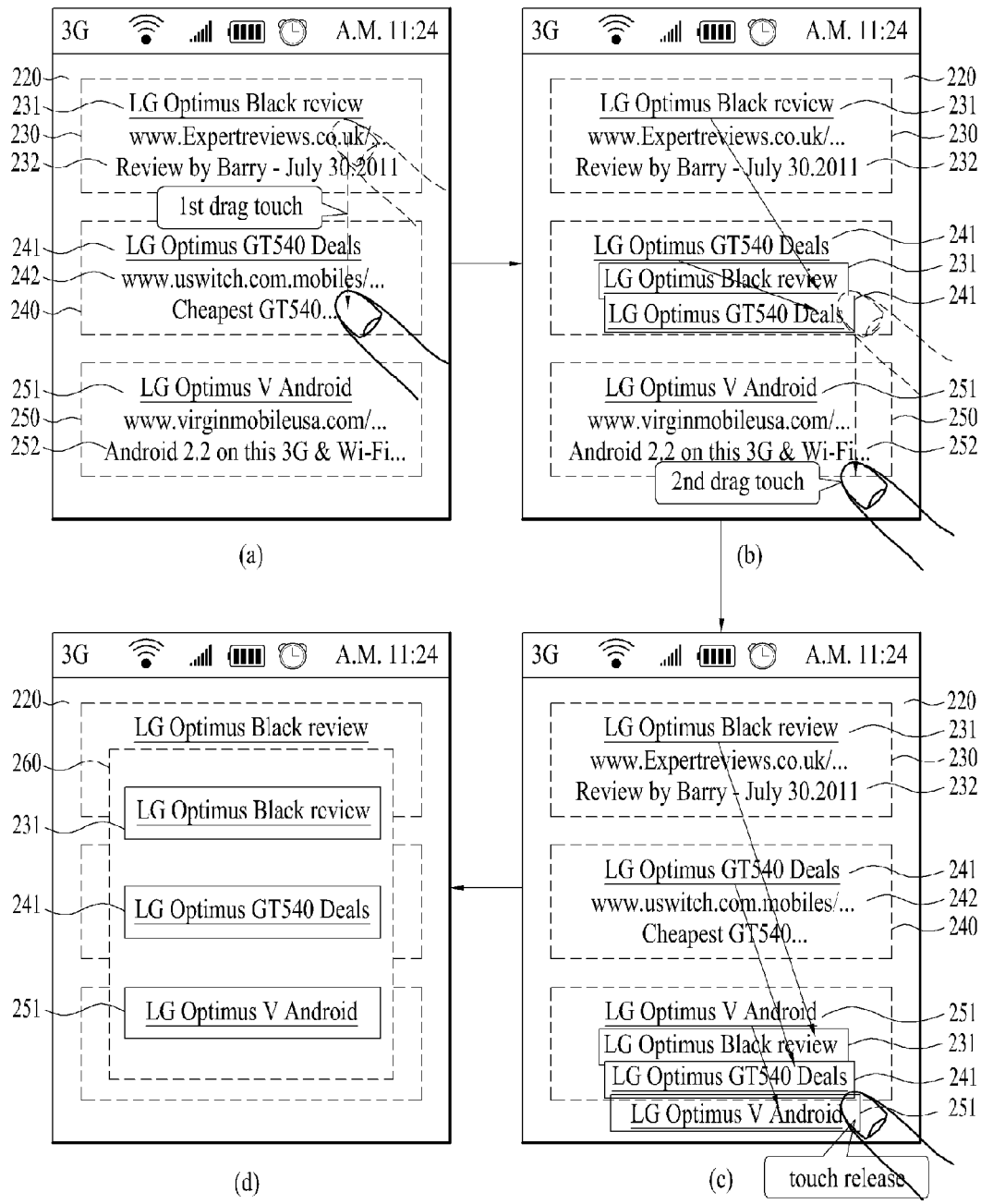

FIG. 9 shows a following process. First of all, if a user's touch pattern, which proceeds in a specific direction, is inputted as the extraction command to the search result screen displayed in the steps S110 to S130 shown in FIG. 3, partial informations of informations proximate to a region, to which the touch pattern proceeds, are sequentially extracted from the search result screen in order of the proximity to the touch pattern. Secondly, the extracted partial informations are then displayed.

In particular, after the search result screen 220 described with reference to the steps S110 to S130 shown in FIG. 3 has been displayed, if a user inputs a drag touch to proceed to a $2^{nd}$ position from a $1^{st}$ position on the search result screen 220 [FIG. 9 (a)], the controller 180 extracts $1^{st}$ and $2^{nd}$ partial informations 231 and 241, which represent $1^{st}$ and $2^{nd}$ hyperlinks 230 and 240 by including the search word (LG Optimus), from the $1^{st}$ and $2^{nd}$ hyper links 230 and 240 proximate to the $1^{st}$ and $2^{nd}$ positions, respectively [FIG. 9 (b)].

Subsequently, the controller 180 enlarges the sizes and touch recognized regions of the extracted $1^{st}$ and $2^{nd}$ partial informations 231 and 241 and then displays the enlarged $1^{st}$ and $2^{nd}$ partial informations 231 and 241 at the touched $2^{nd}$ position.

In particular, while the drag touch is proceeding, the controller 180 extracts the corresponding partial informations of hyperlinks in order of proximity to the drag touch and provides the user with a visual effect as if the extracted partial informations are gradually attached to the position to which the drag touch is inputted like a magnet.

Subsequently, referring to FIG. 9 (b), while the $1^{st}$ and $2^{nd}$ partial informations 231 and 241 are aligned at the $2^{nd}$ position within the search result screen 220, if the user inputs a drag touch to proceed to a $3^{rd}$ position from the $2^{nd}$ position, the controller 180 recognizes a $3^{rd}$ hyperlink 250 proximate to the $3^{rd}$ position.

Referring to FIG. 9 (c), a $3^{rd}$ partial information 251, which represents the $3^{rd}$ hyperlink 250 by including the search word (LG Optimus), is extracted from the recognized $3^{rd}$ hyper link 250. A display size and touch recognized region of the extracted $3^{rd}$ partial information 251 are enlarged. The enlarged $3^{rd}$ partial information 251 is then displayed in a manner of being aligned at the drag-touched $3^{rd}$ position together with the $1^{st}$ and $2^{nd}$ partial informations 231 and 241.

If the user releases the touch, referring to FIG. 9 (d), the controller 180 configures a list 260 of the $1^{st}$ to $3^{rd}$ partial informations 231, 241 and 251 aligned at the $3^{rd}$ position and then displays the list 260 on the search result screen 220.

FIG. 10 shows a following process. First of all, if a specific text within the informations within the search result screen displayed by the steps S110 to S130 shown in FIG. 3 is touched as the extraction command, partial informations, which represent the informations by including the touched text, respectively, are extracted from the informations within the search result screen. Secondly, the extracted partial informations are then displayed.

In particular, after the search result screen 220 displayed by the steps S110 to S130 shown in FIG. 3 has been displayed, if a specific text (LG Optimus) 520 is touched [FIG. 10 (a)], the controller 180 extracts $1^{st}$ to $3^{rd}$ partial informations 231, 241 and 251, which represent the $1^{st}$ to $3^{rd}$ hyperlinks 230, 240 and 250 by including the touched text 520, from the $1^{st}$ to $3^{rd}$ hyperlinks 230, 240 and 250, respectively [FIG. 10 (b)].

Subsequently, the controller 180 aligns and displays the extracted $1^{st}$ to $3^{rd}$ partial informations 231, 241 and 251 as a list 260 in a manner of enlarging the sizes and touch recognized regions of the extracted $1^{st}$ to $3^{rd}$ partial informations 231, 241 and 251.

If a long touch is inputted to the text 520 over a predetermined duration, the controller 180 extracts the $1^{st}$ to $3^{rd}$ partial informations 231, 241 and 251 corresponding to the long-touched text 520.

Besides, after the text 520 has been long touched, as mentioned in the foregoing description with reference to FIG. 9, if the drag touch is inputted to proceed through the first to $3^{rd}$ positions, the controller 180 may be able to extract the $1^{st}$ to $3^{rd}$ partial informations 231, 241 and 251, each of which includes the text 520, in order of proximity to the drag touch proceeding region [not shown in FIG. 10].

FIG. 11 shows a following process. First of all, if a voice search word is inputted as the extraction command again to the search result screen 220 displayed by the steps S110 to S130 shown in FIG. 3, partial informations including the voice search word are extracted from informations within the search result screen. Secondly, the extracted partial informations are then displayed.

In particular, after the search result screen 220 displayed by the steps S110 to S130 shown in FIG. 3 has been displayed, if a function 212A for a voice search word input is selected from the search result screen 220, the controller 180 activates a microphone 122 [FIG. 11 (a)]. If a user's voice search word (LG Optimus) is inputted via the microphone 122, the controller 180 extracts $1^{st}$ to $3^{rd}$ partial informations 231, 241 and 251, which represent the $1^{st}$ to $3^{rd}$ hyperlinks 230, 240 and 250 by including texts corresponding to the voice search word (LG Optimus) 212B, from the $1^{st}$ to $3^{rd}$ hyperlinks 230, 240 and 250, respectively.

Subsequently, the controller 180 displays the extracted $1^{st}$ to $3^{rd}$ partial informations 231, 241 and 251 as a list 260 in a manner of enlarging the sizes and touch recognized regions of the extracted $1^{st}$ to $3^{rd}$ partial informations 231, 241 and 251.

Figure 12:
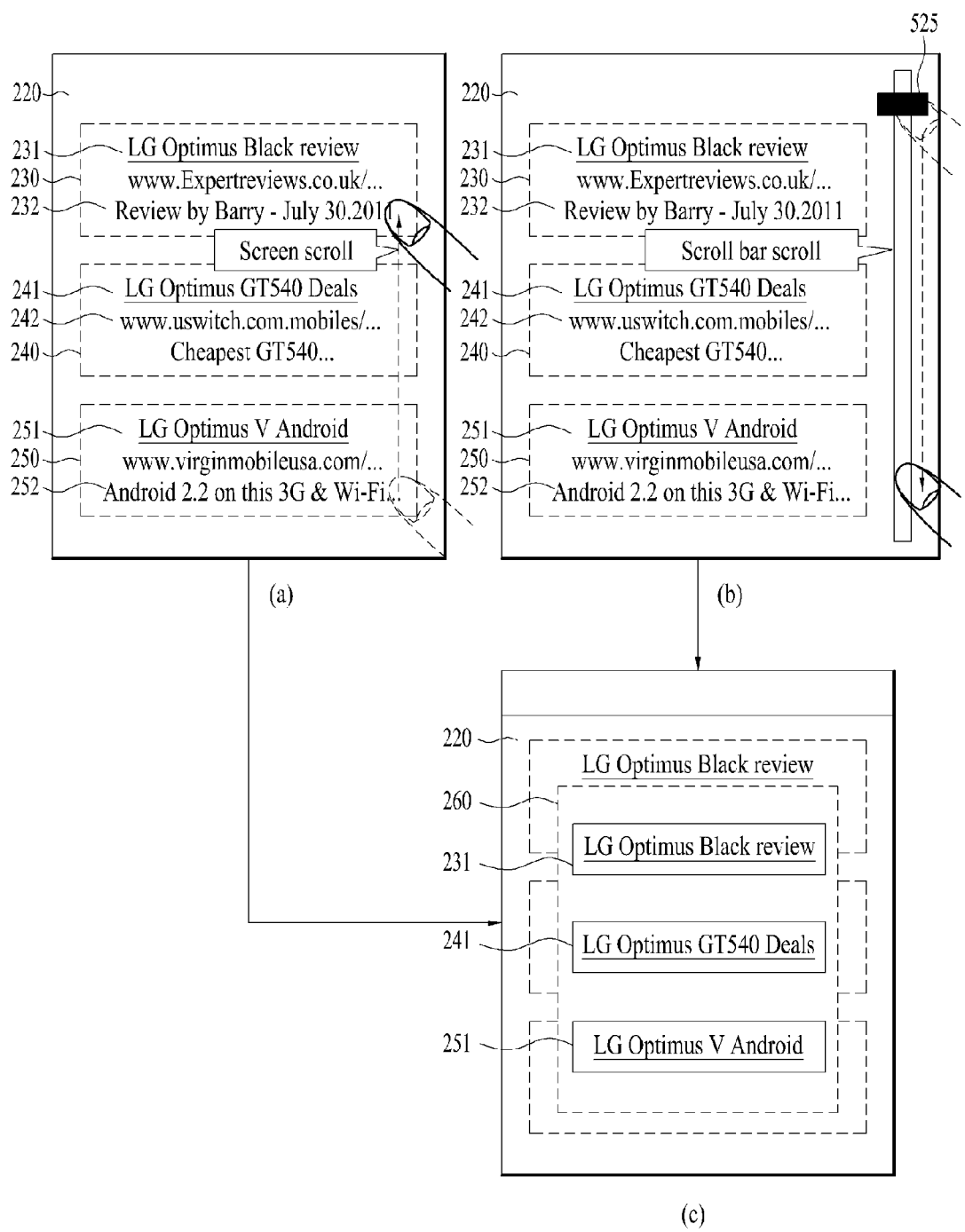

FIG. 12 shows a following process. First of all, if the search result screen is scrolled as the extraction command on the search result screen displayed by the steps S110 to S130 shown in FIG. 3, partial informations of informations proximate to the scrolled region are extracted from the search result screen in order of proximity to the scroll direction.

In particular, after the search result screen 220 displayed by the steps S110 to S130 shown in FIG. 3 has been displayed, if a touch to scroll the search result screen 220 in a specific direction (e.g., top direction) is inputted by a user [FIG. 12 (*a*)], the controller 180 scrolls the search result screen 220 in the specific direction in accordance with the inputted touch and then extracts partial informations 231, 241 and 251 of $1^{st}$ to $3^{rd}$ hyperlinks 230, 240 and 250 having disappeared from the search result screen 220 in accordance with the scroll [FIG. 12 (*c*)].

The controller enlarges the sizes and touch recognized regions of the extracted partial informations 231, 241 and 251 and then displays the enlarged partial informations 231, 241 and 251 as a list 260.

Moreover, referring to FIG. 12 (*b*), a scroll bar for a scroll of the search result screen 220 may be displayed within the search result screen 220. If the user touches and shifts the scroll bar, referring to FIG. 12 (*c*), the search result screen 220 is scrolled in accordance with a shifted distance of the scroll bar. And, the partial informations 231, 241 and 251 of the $1^{st}$ to $3^{rd}$ hyperlinks 230, 240 and 250 having disappeared from the search result screen 220 in accordance with the scroll are then extracted.

FIG. 13 shows a following process. First of all, if a menu function 530 of extracting the corresponding partial informations within the search result screen displayed by the steps S110 to S130 shown in FIG. 3 is selected as the extraction command, partial informations including a search word are extracted from the informations within the search result screen. Secondly, the extracted partial informations are then displayed.

In particular, the controller 180 displays the menu function 530 within the search result screen 220 displayed by the steps S110 to S130 shown in FIG. 3. If a user selects the menu function 530 [FIG. 13 (*a*)], the controller extracts partial informations 231, 241 and 251, which represent the $1^{st}$ to $3^{rd}$ hyperlinks 230, 240 and 250 by including the search word (LG Optimus), from the $1^{st}$ to $3^{rd}$ hyperlinks 230, 240 and 250, respectively [FIG. 13 (*b*)].

Subsequently, the controller 180 enlarges the sizes and touch recognized regions of the extracted partial informations 23, 241 and 251 and then aligns and displays the enlarged informations as a list 260.

Figure 14:
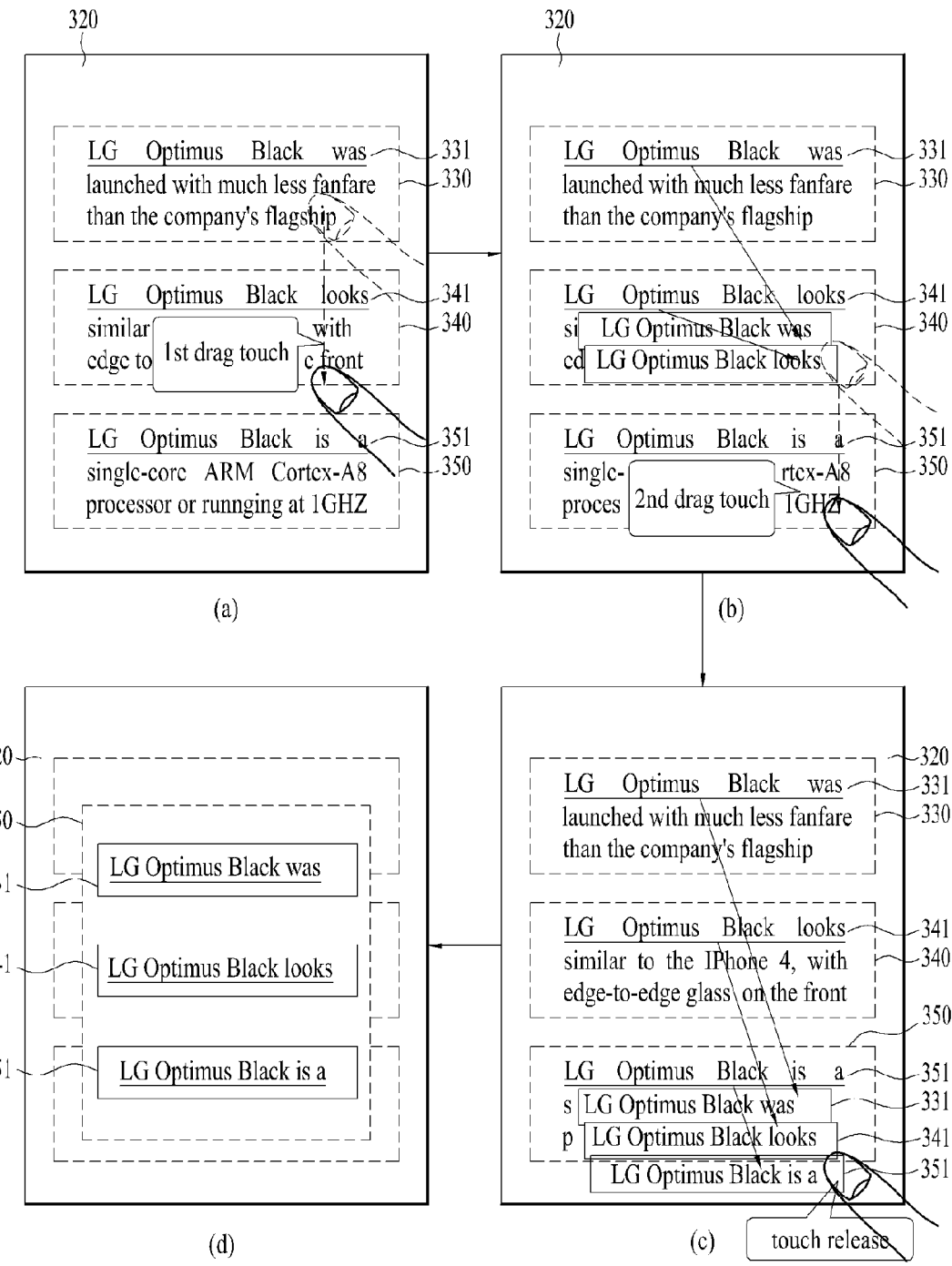

FIG. 14 shows a following process. First of all, the search result screen displayed by the steps S110 to S130 shown in FIG. 3 is a document screen containing a plurality of sentences related to a search word. Secondly, if a user's touch pattern is inputted as the extraction command to proceed in a specific direction, partial informations of the sentences proximate to the touch pattern proceeding region are sequentially extracted from the search result screen in order of proximity to the touch pattern. Thirdly, the extracted partial informations are then displayed.

In particular, after the controller 180 has displayed the search result screen 320 displayed by the steps S110 to S130 shown in FIG. 3, if a user inputs a drag touch to proceed from a $1^{st}$ position to a $2^{nd}$ position on the search result screen 320 [FIG. 14 (*a*)], the controller 180 extracts $1^{st}$ and $2^{nd}$ partial informations 331 and 341, which represent $1^{st}$ and $2^{nd}$ sentences 330 and 340 by including the search word (LG Optimus), from the $1^{st}$ and $2^{nd}$ sentences (or clauses) 330 and 330 proximate to the $1^{st}$ and $2^{nd}$ positions, respectively.

In this case, the partial information may include a line that contains the search word within the corresponding sentence. If at least two lines exist in the corresponding sentence, the partial information may become a top line.

The controller 180 enlarges the sizes and touch recognized regions of the extracted $1^{st}$ and $2^{nd}$ partial informations 331 and 341. The controller displays the enlarged $1^{st}$ and $2^{nd}$ partial informations 331 and 341 in a manner of aligning them at the touched $2^{nd}$ position.

In particular, while the drag touch is proceeding, the controller 180 extracts the corresponding partial informations of the sentences in order of the proximity to the drag touch and provides the user with a visual effect as if the extracted partial informations are gradually attached to the drag touch inputted position like a magnet.

Subsequently, referring to FIG. 14 (*b*), while the $1^{st}$ and $2^{nd}$ partial informations 331 and 341 are aligned at the $2^{nd}$ position within the search result screen 320, if the user inputs a drag touch that proceeds to a $3^{rd}$ position from the $2^{nd}$ position, the controller 180 recognizes a $3^{rd}$ sentence 350 proximate to the $3^{rd}$ position.

Thereafter, referring to FIG. 14 (*c*), the controller 180 extracts a $3^{rd}$ partial information 351, which represents the $3^{rd}$ sentence 350 by including the search word (LG Optimus), from the recognized $3^{rd}$ sentence 350, enlarges the display size and touch recognized region of the extracted $3^{rd}$ partial information 351, and then displays the enlarged $3^{rd}$ partial information 351 in a manner of aligning the enlarged partial information 351 at the drag-touched $3^{rd}$ position together with the $1^{st}$ and $2^{nd}$ partial informations 331 and 341.

If the user releases the touch, referring to FIG. 14 (*d*), the controller 180 configures the $1^{st}$ to $3^{rd}$ partial informations 331, 341 and 351 aligned at the $3^{rd}$ position into a list 350 and then displays the list 350 on the search result screen 320.

Besides, the controller 180 extracts the corresponding partial informations from the informations within the document search result screen 320 by the processes shown in FIG. 7 and FIGS. 9 to 13 and may display the extracted partial informations [not shown in the drawing].

Figure 15:
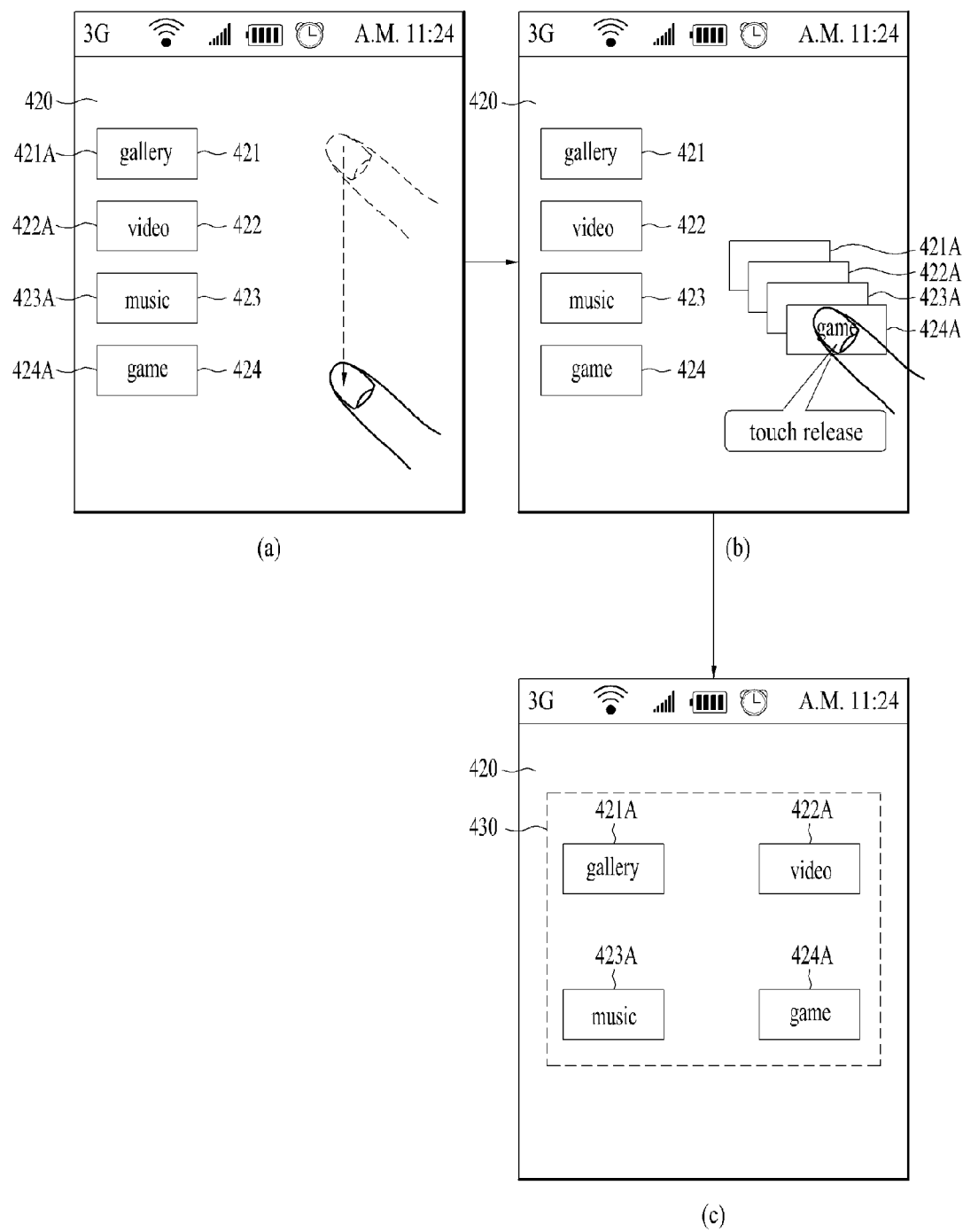

FIG. 15 shows a following process. First, the search result screen displayed by the steps S110 to S130 shown in FIG. 3 includes a standby screen containing a plurality of applications. Secondly, if a user's touch pattern is inputted as the extraction command to proceed in a specific direction, partial informations of applications proximate to the touch pattern proceeding region are sequentially extracted in order of proximity to the touch pattern. Thirdly, the extracted partial informations are then displayed.

In particular, after the controller 180 has displayed the search result screen 420 displayed by the steps S110 to S130 shown in FIG. 3, if a user inputs a drag touch to proceed from a $1^{st}$ position to a $2^{nd}$ position on the standby screen 420 [FIG. 15 (*a*)], the controller 180 extracts $1^{st}$ to $4^{th}$ partial informations 421A, 422A, 423A and 424A, which represent $1^{st}$ to $4^{th}$ applications 421 to 424 by being related to the search word (Multimedia), from the $1^{st}$ to $4^{th}$ applications 421 to 424 proximate to the $1^{st}$ position and the $2^{nd}$ position, respectively [FIG. 15 (*b*)].

In this case, the partial informations 421A, 422A, 423A and 424A may become title informations of the applications 421, 422, 423 and 424, respectively.

The controller 180 enlarges the sizes and touch recognized regions of the extracted $1^{st}$ to $4^{th}$ partial informations 421A, 422A, 423A and 424A and then aligns and displays the enlarged $1^{st}$ to $4^{th}$ partial informations 421A, 422A, 423A and 424A at the touched $2^{nd}$ position.

If the user releases the touch, referring to FIG. 15 (c), the controller 180 configures the $1^{st}$ to $4^{th}$ partial informations 421A, 422A, 423A and 424A aligned at the $2^{nd}$ position into a list 430 and then displays the list 430 on the standby screen 430.

Besides, the controller 180 extracts the corresponding partial informations from the informations within the standby screen 420 by the processes shown in FIG. 7 and FIGS. 9 to 13 and may be then able to display the extracted partial informations [not shown in the drawing].

In the above description, the steps S135 to S150 shown in FIG. 3 are explained in detail with reference to FIGS. 8 to 15.

In the following description, the step S155 shown in FIG. 3 shall be explained in detail with reference to FIGS. 16 to 24.

FIGS. 16 to 24 are diagrams for describing the step S110 to S155 shown in FIG. 3.

Figure 16:
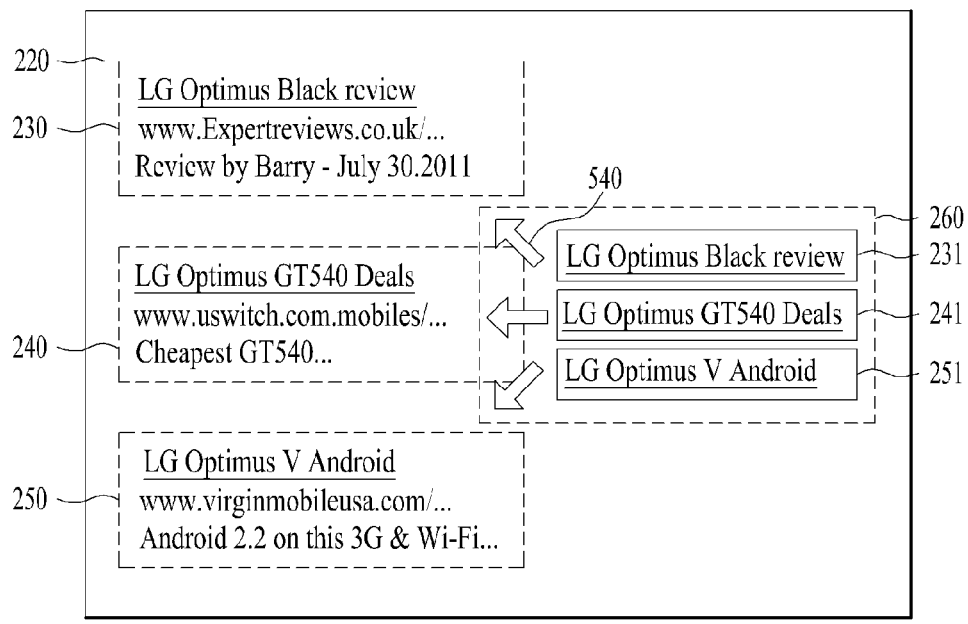

FIG. 16 shows a following process. First of all, if a list containing partial informations is displayed by the steps S110 to S150 shown in FIG. 3 is displayed, position informations of the informations respectively corresponding to the partial information in a search result screen are displayed within the list.

Referring to FIG. 16, if a list 260 containing the partial informations 231, 241 and 251 is displayed on the search result screen 220, the controller recognizes positions of informations 230, 240 and 250 respectively corresponding to the partial informations 231, 241 and 251 with reference to the positions of the partial informations 231, 241 and 251 in the list 260.

The controller 180 creates a position information 540 indicating each of the recognized positions and then displays the created position information 540 at each of the corresponding partial informations 231, 241 and 251 within the list 260.

For instance, FIG. 16 shows that the position information is an arrow indicating a direction. Moreover, the position information 540 may include one of a page number, a line number and the like, at which each of the corresponding partial informations 231, 241 and 251 is situated.

Figure 17:
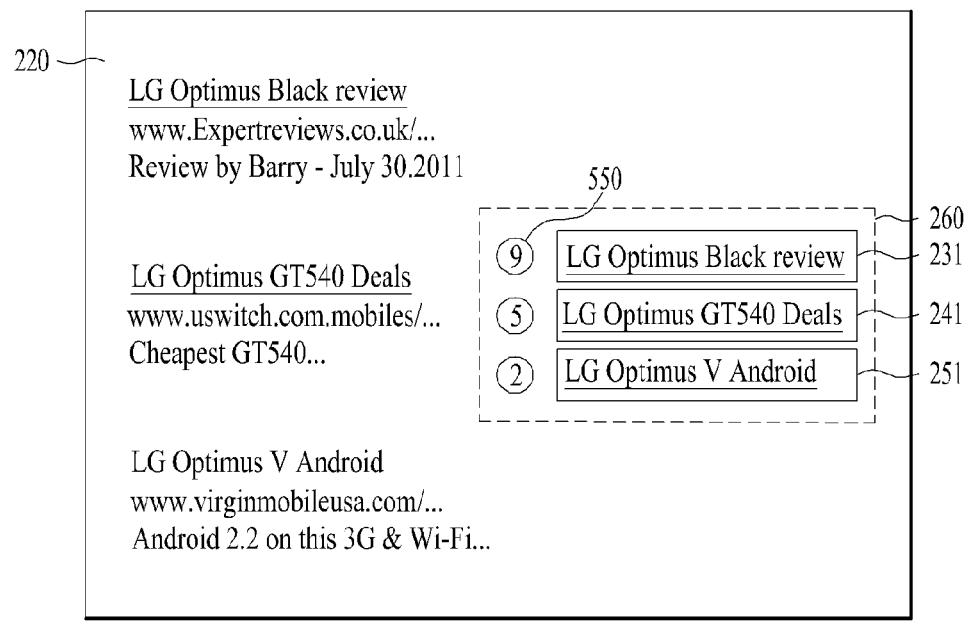

FIG. 17 shows a following process. First of all, if a list containing partial informations is displayed by the steps S110 to S150 shown in FIG. 3 is displayed, the number of search words (LG Optimus) included in an information corresponding to each of the partial informations is recognized. An information indicating the recognized number of the included search words is then displayed in the list.

Referring to FIG. 17, if a list 260 including the partial informations 231, 241 and 251 is displayed on the search result screen 220, the controller 180 recognizes the number of the search words (LG Optimus) included in the information 230/240/250 included in the partial information 231/241/251 and then displays an information 550 indicating the recognized number of the search words (LG Optimus) on each of the partial informations 231, 241 and 251 in the list 260.

For instance, FIG. 17 shows that the included number information 550 is a numeral indicating the included number.

If the informations are hyperlinks, the controller 180 recognizes the number of words equal to the search word (LG Optimus) in a webpage linked to each of the hyperlinks and then displays an information 550 indicating the recognized number.

In particular, the greater the search word included number gets, the more accurate the information on the search word becomes. If a user looks at the included number, the user may be able to know which information is more accurate for a search word inputted by the user.

FIG. 18 shows a following process. First of all, a list containing partial informations is displayed by the steps S110 to S150 shown in FIG. 3 is displayed. Secondly, if a specific partial information is selected from the list, a whole information of an information corresponding to the selected partial information is displayed.

Referring to FIG. 18, if a $1^{st}$ partial information 231 is selected from the list 260 [FIG. 18 (a)], the controller 180 displays a webpage linked to a hyperlink 230 corresponding to the selected $1^{st}$ partial information 231 [FIG. 18 (b)].

If an information corresponding to the partial information selected from the list is a sentence within a document, the controller 180 displays a whole page or document at which the sentence is situated in the document.

If an information corresponding to the partial information selected from the list is an application, the controller 180 activates the application and then displays an activated screen of the application.

FIG. 19 shows a following process. First of all, a list containing partial informations is displayed by the steps S110 to S150 shown in FIG. 3 is displayed. Secondly, if a specific partial information is selected from the list, a menu function of editing the selected partial information is provided.

Referring to FIG. 18, if a $1^{st}$ partial information 231 is selected from the list 260 [FIG. 18 (a)], the controller 180 displays an editing menu list 560 for the $1^{st}$ partial information 231.

In this case, the editing menu list 560 may include a deleting menu 561, a transmitting menu 562, a saving menu 563 and a bookmark menu 564, by which the editing menu function of the present invention may be non-limited. For instance, any function of editing the partial information may be included in this function.

If the deleting menu 561 is selected, the controller 180 deletes the $1^{st}$ partial information from the list 260.

If the transmitting menu 562 is selected, the controller 180 displays a contact input window. If a specific contact is inputted via the displayed input window, the controller 180 may transmit the $1^{st}$ partial information 231 to the inputted contact via the wireless communication unit 110.

If the saving menu 563 is selected, the controller 180 may save the $1^{st}$ partial information 231 in the memory 160.

If the bookmark menu 564 is selected, the controller 180 registers the $1^{st}$ partial information 231 in a bookmark list.

Figure 21:
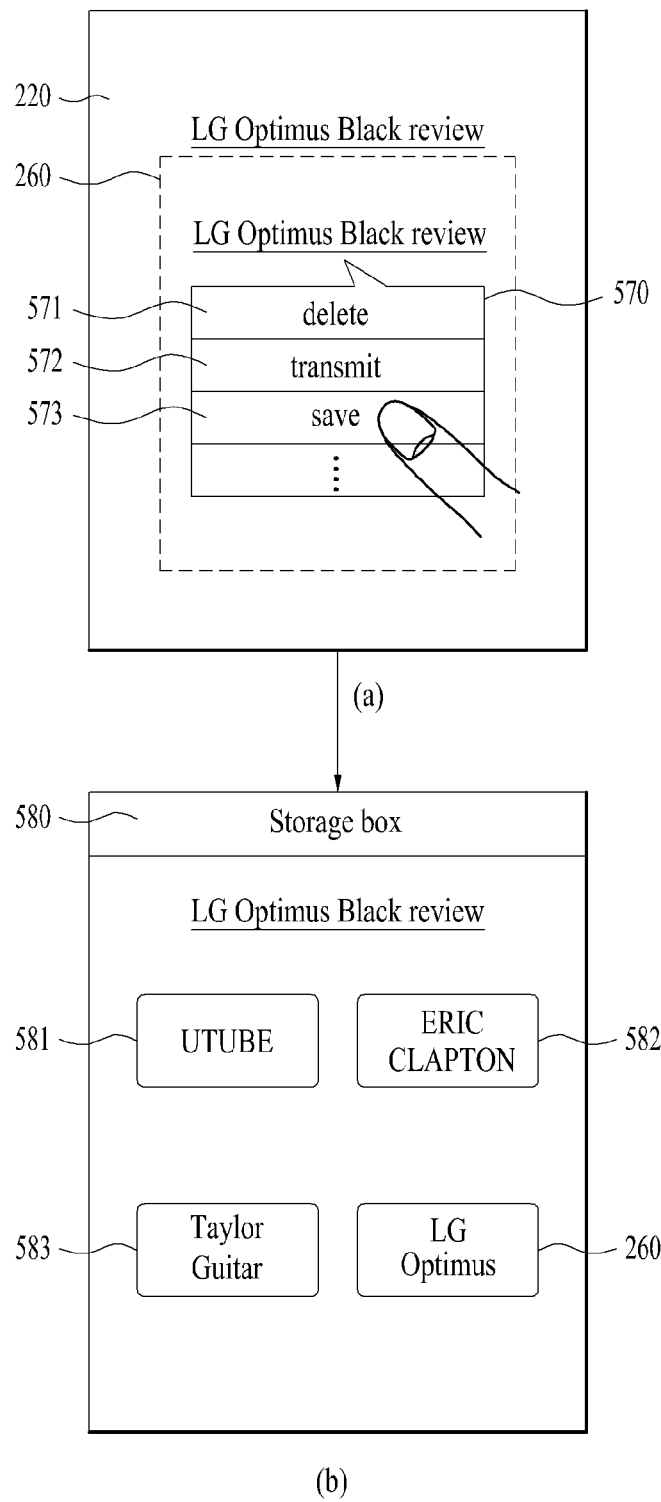

FIG. 20 and FIG. 21 show a following process. First of all, a list containing partial informations is displayed by the steps S110 to S150 shown in FIG. 3 is displayed. Secondly, if the list is selected, a menu function of editing the list is provided.

Referring to FIG. 20, if the list 260 is selected [FIG. 20 (a)], the controller 180 displays an editing menu list 570 for the list 260 [FIG. 20 (b)].

In this case, the editing menu list 570 may include a deleting menu 571, a transmitting menu 572, a saving menu 573 and the like, by which the editing menu function of the present invention may be non-limited. For instance, any function of editing the list may be included in this function.

If the deleting menu 571 is selected, the controller 180 deletes the list 260 from the search result screen 220.

If the transmitting menu 572 is selected, the controller 180 displays a contact input window. If a specific contact is inputted via the displayed input window, the controller 180 may transmit list 260 including the partial informations 231, 241 and 251 to the inputted contact via the wireless communication unit 110.

In doing so, a title of the list 260 is set to a search word (LG Optimus) according to the search result screen 220 and may be then transmitted to the contact.

Moreover, referring to FIG. 21 (a), if the saving menu 573 is selected, the controller 180 sets a title of the list 260 to a search word (LG Optimus) according to the search result screen 220 and then saves the list 260 entitled the search word (LG Optimus) in the memory 160.

In doing so, referring to FIG. 21 (b), a storage region of a storage box 580 for storing the list containing the partial informations is assigned to the memory 160. The controller 180 saves the list 260 entitled the search word (LG Optimus) in the memory 160.

For instance, a $1^{st}$ list 581 entitled a previously saved search word 'UTUE', a $2^{nd}$ list 582 entitled a search word 'ERIC CLAPTON' and a $3^{rd}$ list 582 entitled a search word 'Taylor Guitar' are saved in the storage box 580. And, the list 260 entitled the search word 'LG Optimus' is also saved in the storage box 580 by the process shown in FIG. 21.

In particular, a user confirms the titles of the lists in the storage box 580 and may be then bale to read the information in a specific list.

FIG. 22 shows a following process. First of all, the list is created and displayed on a $1^{st}$ page of a search result screen by the steps S110 to S150 shown in FIG. 3. Secondly, if the $1^{st}$ page is turned to a $2^{nd}$ page previous or next to the $1^{st}$ page, the list created within the $1^{st}$ page is not displayed on the $2^{nd}$ page.

Referring to FIG. 22 (a), a $1^{st}$ page 220A of a search result screen is shown. And, the list 260 includes partial informations 231, 241 and 251 within the $1^{st}$ page 220A.

If a touch pattern of a command for turning the $1^{st}$ page 220A to a $2^{nd}$ page 220B previous or next to the $1^{st}$ page 220A is inputted to the $1^{st}$ page 220A, referring to FIG. 22 (b), the controller 180 turns the $1^{st}$ page 220A to the $2^{nd}$ page 220B to display but may not display the list 260 on the $2^{nd}$ page 220B.

Yet, if the $2^{nd}$ page 220B is turned back to the $1^{st}$ page 220A, the controller 180 re-displays the list 260 on the $1^{st}$ page 220A.

Meanwhile, a user may be able to use the touch pattern for the page turning in a manner of setting the touch pattern to a user-specific pattern.

In particular, the controller 180 provides the user with a menu for setting a touch pattern for assigning the page turning function within the search result screen. If the user selects the setting menu, the controller 180 may display a touch pattern input window for assigning the page turning function.

If a user's touch pattern is inputted via the touch pattern input window, the controller 180 maps the page turning function to the inputted touch pattern and then saves it in the memory 160.

For instance, a user sets 'left-direction flicking touch pattern (←)' and 'right-direction flicking touch pattern (→)' as a touch pattern to map to a forward page shift function and a touch pattern to map to a backward page shift function, respectively, and then saves the pattern settings. If the 'left-direction flicking touch pattern (←)' is inputted to the $1^{st}$ page 220A, the controller displays a page next to the $1^{st}$ page. If the 'right-direction flicking touch pattern (→)' is inputted to the $1^{st}$ page 220A, the controller displays a page previous to the $1^{st}$ page.

FIG. 23 shows a following process. First of all, a $1^{st}$ list including partial informations in a $1^{st}$ page of a search result screen and a $2^{nd}$ list including partial informations in a $2^{nd}$ page of the search result screen are created by the steps S110 to S150 shown in FIG. 3. Secondly, if the $1^{st}$ page is displayed, the $1^{st}$ list is displayed within the $1^{st}$ page. Thirdly, I a touch command for turning the $1^{st}$ list to the $2^{nd}$ list is inputted to the $1^{st}$ list, the $1^{st}$ page is turned to the $2^{nd}$ page and the $2^{nd}$ list is then displayed on the $2^{nd}$ page.

In particular, referring to FIG. 23 (a), while $1^{st}$ and $2^{nd}$ lists 260A and 260B including partial informations within $1^{st}$ and $2^{nd}$ pages 220A and 220B of a search result screen are created, respectively, I the $1^{st}$ page 220A is displayed, the controller 180 displays the $1^{st}$ list 260A corresponding to the $1^{st}$ page 220A.

If a touch pattern for turning the $1^{st}$ list 260A to the $2^{nd}$ list 260B is inputted to the $1^{st}$ list 2601, the controller 180 turns the $1^{st}$ list 260A to the $2^{nd}$ list 260B and then displays the $2^{nd}$ list 260B.

In doing so, referring to FIG. 23 (b), if the $1^{st}$ list 260A is turned to the $2^{nd}$ list 260B, the controller 180 may be able to turn the $1^{st}$ page 220A to the $2^{nd}$ page 220B as well.

Moreover, if the $1^{st}$ list 260A is turned to the $2^{nd}$ list 260B, the controller 180 may be able to display the turned $2^{nd}$ list 260B on the $1^{st}$ page 220A without the page turning.

Optionally, as mentioned in the foregoing description, the user may be able to use the touch pattern for the page turning in a manner of setting the touch pattern to a user-specific form.

Figure 24:
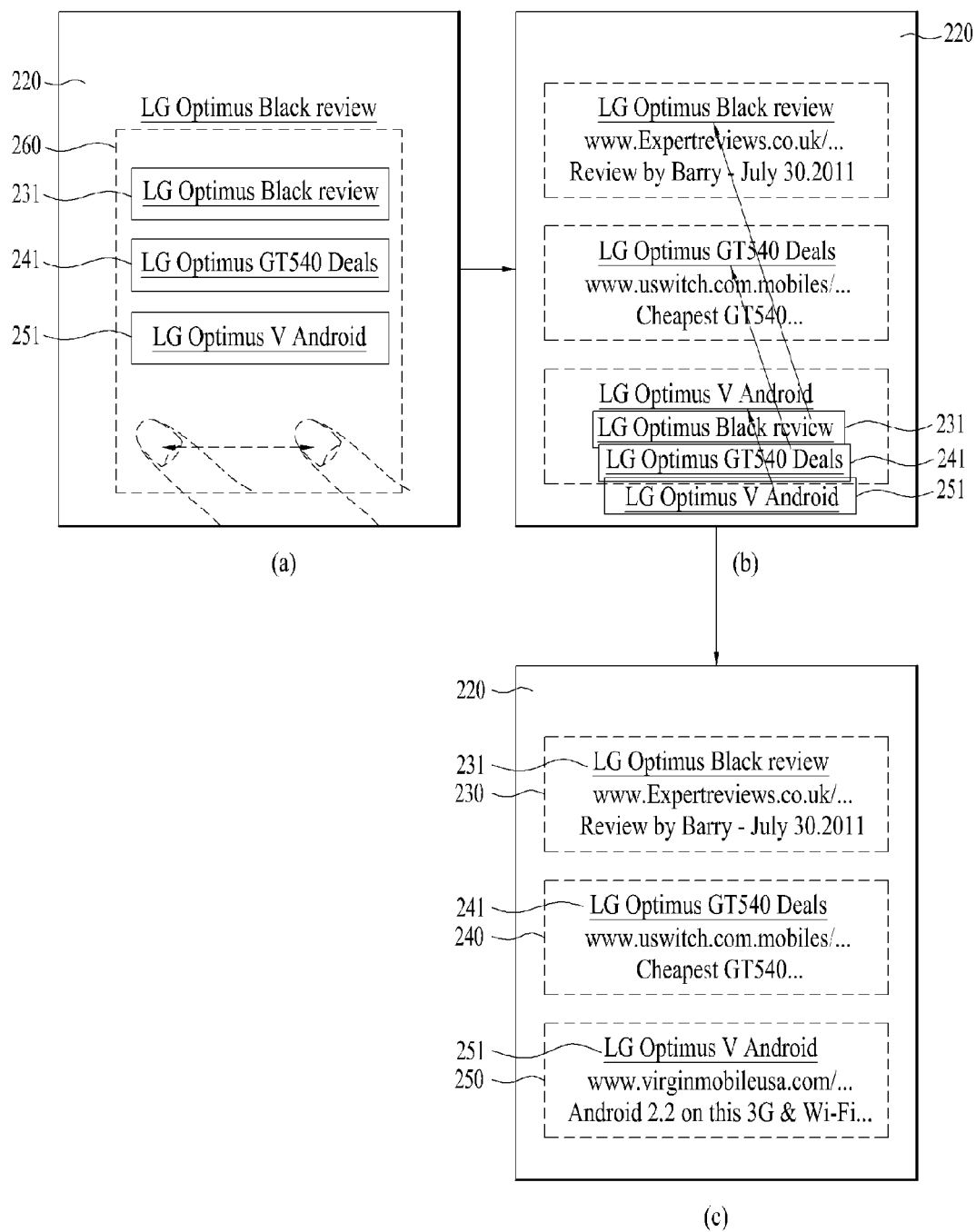

FIG. 24 shows a following process. First of all, the list is displayed on a search result screen by the steps S110 to S150 shown in FIG. 3. Secondly, if a user inputs a touch pattern for deleting the list, the list is deleted from the search result screen.

Referring to FIG. 24, if a touch pattern for deleting the list 260 is inputted to the list 260 [FIG. 24 (a)], the controller 180 deletes the list 260 and displays a visual effect that partial informations 231, 241 and 251 in the list 260 are gradually moving toward their original positions [FIG. 24 (b), FIG. 24 (c)]. In this case, the touch pattern may include a touch pattern having a figure that the list is erased by an eraser. In particular, the touch pattern may include a touch pattern that is dragged at least twice in horizontal direction. Optionally, as mentioned in the foregoing description, the user may be able to use the touch pattern for the list deletion in a manner of setting the touch pattern to a user-specific form.

Accordingly, the present invention provides the following effect and/or advantage. First of all, after a search for informations related to an inputted search word have been performed, while the found informations are displayed, partial informations respectively representing the displayed informations by including the search word are extracted from the displayed informations. Finally, the extracted informations are enlarged and displayed as a list. Therefore, the present invention enables a user to select a prescribed information from a small screen of a mobile terminal more accurately and easily.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a touchscreen configured to display a first list on a search result screen, the first list including at least one content item associated with a search term; and
    a controller configured to:
        extract a title information item from the displayed at least one content item in response to a first input, wherein the extracted title information item includes a title of the at least one content item including the search term and context information of the search term from the corresponding at least one content item;
enlarge a display size of the extracted title information item; and
cause the touchscreen to display a second list including the enlarged title information item, wherein the second list is different from the first list, wherein:
the first list comprises a plurality of content items;
the first input comprises a drag touch input to the search result screen in a specific direction; and
the controller is further configured to sequentially extract a plurality of title information items corresponding to the plurality of content items according to an order of proximity to the touch input as the drag touch input is moved in the specific direction.

2. The mobile terminal of claim 1, wherein the at least one content item comprises an Internet hyperlink to a webpage related to the search term.

3. The mobile terminal of claim 1, wherein the at least one content item comprises at least a word, a sentence, or a paragraph from a document related to the search term.

4. The mobile terminal of claim 1, wherein:
the at least one content item comprises an application; and
the search term is used to find the application from a plurality of different applications.

5. The mobile terminal of claim 1, further comprising:
a microphone configured to receive an audio input comprising the search term, wherein the at least one content item is found using text of the search term.

6. The mobile terminal of claim 1, wherein the controller is further configured to cause the touchscreen to:
display a visual effect showing a shift and alignment of the extracted plurality of title information items to a location proximate to a completion point of the touch input; and
distinctively display the second list from the first list on the search result screen.

7. The mobile terminal of claim 1, wherein the controller is further configured to extract the title information item from a corresponding part of the search result screen when a duration time of the first input exceeds a threshold time duration.

8. The mobile terminal of claim 1, wherein:
the first input comprises scrolling the search result screen in the specific direction; and
the controller is further configured to sequentially extract a plurality of title information items corresponding to the plurality of content items in an order according to a proximity of each of the plurality of title information items to an edge of the search results screen opposite the specific direction.

9. The mobile terminal of claim 1, further comprising:
a memory configured to store the second list, wherein the controller is further configured to assign a title to the second list and cause the memory to store the assigned title.

10. The mobile terminal of claim 1, wherein the controller is further configured to cause the display to display the at least one content item associated with the title information item when the title information item is selected from the second list.

11. The mobile terminal of claim 1, wherein:
the second list comprises a plurality of title information items corresponding to the plurality of content items; and
the controller is further configured to cause the touchscreen to display a correspondence indicator on the second list indicating a correspondence between a title information item of the second list and a corresponding content item of the first list.

12. The mobile terminal of claim 1, wherein the controller is further configured to cause the touchscreen to display a user interface comprising an editing function that allows editing of the title information item using an editing scheme in response to a selection of the title information item from the second list.

13. The mobile terminal of claim 1, wherein:
the search result screen comprises a first page and a second page, the second page either preceding or following the first page; and
the controller is further configured to cause the touchscreen to cease display of the second list when a touch command is received for turning from the first page to the second page.

14. The mobile terminal of claim 1, wherein:
the search result screen comprises a first page and a second page, the second page either preceding or following the first page; and
the controller is further configured to cause the touchscreen to display a third list comprising one or more title information items extracted from content items of the second page when a touch command is received for turning from the first page to the second page.

15. The mobile terminal of claim 1, wherein the controller is further configured to:
recognize a number of instances of the search term found within the title information item; and
cause the touchscreen to display the recognized number on the second list.

16. The mobile terminal of claim 1, wherein the controller is further configured to cause the touchscreen to cease display of the second list when a touch command for interrupting display of the second list is received.

17. A method of controlling a mobile terminal, the method comprising:
displaying, on a touchscreen, a first list on a search result screen, the first list including at least one content item associated with a search term;
extracting a title information item from the displayed at least one content item in response to a first input, wherein the extracted title information item includes a title of the at least one content item including the search term and context information of the search term from the corresponding at least one content item;
enlarging a display size of the extracted title information item; and
displaying a second list including the extracted title information item, wherein the second list is different from the first list, wherein:
the first list comprises a plurality of content items;
the first input comprises a drag touch input to the search result screen in a specific direction; and
the extracting step comprising sequentially extracting a plurality of title information items corresponding to the plurality of content items according to an order of proximity to the touch input as the drag touch input is moved in the specific direction.

* * * * *